United States Patent
Hu et al.

(10) Patent No.: US 12,101,784 B2
(45) Date of Patent: Sep. 24, 2024

(54) CONTROL INFORMATION INDICATING METHOD, COMMUNICATION NODE AND COMPUTER READABLE STORAGE MEDIUM

(71) Applicant: ZTE Corporation, Guangdong (CN)

(72) Inventors: Youjun Hu, Guangdong (CN); Bo Dai, Guangdong (CN); Luanjian Bian, Guangdong (CN); Huiying Fang, Guangdong (CN); Weiwei Yang, Guangdong (CN); Kun Liu, Guangdong (CN)

(73) Assignee: ZTE Corporation, Shenzhen (CN)

( * ) Notice: Subject to any disclaimer, the term of this patent is extended or adjusted under 35 U.S.C. 154(b) by 251 days.

(21) Appl. No.: 17/737,846

(22) Filed: May 5, 2022

(65) Prior Publication Data
US 2022/0377783 A1    Nov. 24, 2022

Related U.S. Application Data

(63) Continuation of application No. PCT/CN2020/127557, filed on Nov. 9, 2020.

(30) Foreign Application Priority Data

Nov. 8, 2019   (CN) .......................... 201911089433.8

(51) Int. Cl.
   *H04W 72/23*    (2023.01)
   *H04L 1/1812*   (2023.01)

(52) U.S. Cl.
   CPC ........... *H04W 72/23* (2023.01); *H04L 1/1812* (2013.01)

(58) Field of Classification Search
   CPC ... H04L 1/1896; H04L 1/0031; H04L 1/1822; H04L 1/1812; H04L 1/0025; H04W 72/23
   See application file for complete search history.

(56) References Cited

U.S. PATENT DOCUMENTS

| 9,320,031 B2 | 4/2016 | Suzuki et al. |
| 10,172,127 B2 | 1/2019 | Chatterjee et al. |

(Continued)

FOREIGN PATENT DOCUMENTS

| CA | 3056577 A1 | 9/2018 |
| CN | 102160412 A | 8/2011 |

(Continued)

OTHER PUBLICATIONS

First Examination Report received in corresponding Indian Patent Application No. 202247026970, dated Dec. 15, 2022, 7 pages.
Korean office action issued in KR Patent Application No. 10-2022-7019179, dated Sep. 13, 2023, 6 pages. English translation included.
ZTE, "Consideration on scheduling enhancement for MTC," 3GPP TSG RAN WG1 Meeting #98b, R1-1910264, Chongqing, China, Oct. 14-18, 2019, 20 pages.

(Continued)

*Primary Examiner* — Chi Ho A Lee
(74) *Attorney, Agent, or Firm* — Perkins Coie LLP

(57) ABSTRACT

Provided are a control information indicating method, a communication node and a computer-readable storage medium. The method includes: sending, by a first communication node, control information to a second communication node, where the control information is used for indicating the scheduling of one or more transport blocks, each transport block corresponds to a respective one of hybrid automatic repeat request (HARQ) processes when being scheduled, and each HARQ process has a corresponding HARQ process index and new data indication (NDI) information.

24 Claims, 4 Drawing Sheets

A first communication node sends control information to a second communication node, where the control information is used for indicating scheduling of one or more transport blocks, each transport block corresponds to a respective one of hybrid automatic repeat request (HARQ) processes when being scheduled, and each HARQ process has a corresponding HARQ process index and new data indication (NDI) information    S110

(56) References Cited

U.S. PATENT DOCUMENTS

| | | | |
|---|---|---|---|
| 10,700,821 B2 | 6/2020 | Andersson et al. | |
| 10,785,791 B1 | 9/2020 | Eyuboglu | |
| 11,528,099 B2 | 12/2022 | Ren et al. | |
| 2011/0194499 A1 | 8/2011 | Aiba et al. | |
| 2013/0016604 A1 | 1/2013 | Ko et al. | |
| 2017/0302493 A1* | 10/2017 | Yang | H04W 72/21 |
| 2018/0359772 A1* | 12/2018 | Park | H04W 72/1268 |
| 2019/0168104 A1* | 6/2019 | Doerksen | A63C 17/26 |
| 2019/0207734 A1 | 7/2019 | Yang et al. | |
| 2020/0015212 A1* | 1/2020 | Lyu | H04L 5/0053 |
| 2020/0187237 A1* | 6/2020 | Su | H04L 1/08 |
| 2020/0236710 A1* | 7/2020 | Sun | H04L 5/0016 |
| 2020/0267730 A1* | 8/2020 | Kim | H04W 72/0453 |
| 2021/0152290 A1* | 5/2021 | Li | H04L 1/0067 |
| 2021/0250980 A1* | 8/2021 | Xue | H04W 52/0216 |
| 2021/0321413 A1* | 10/2021 | Shin | H04W 56/0045 |
| 2022/0264611 A1* | 8/2022 | Yoshimura | H04L 5/0094 |
| 2022/0330312 A1* | 10/2022 | Zhou | H04W 68/005 |
| 2023/0156718 A1* | 5/2023 | Sengupta | H04L 1/1896 370/329 |

FOREIGN PATENT DOCUMENTS

| | | |
|---|---|---|
| CN | 103202058 A | 7/2013 |
| CN | 103220691 A | 7/2013 |
| CN | 108541360 A | 9/2018 |
| CN | 110419183 A | 11/2019 |
| CN | 111092692 A | 5/2020 |
| EP | 2082516 A1 | 7/2009 |
| EP | 3522393 A1 | 8/2019 |
| EP | 3534559 A1 | 9/2019 |
| EP | 3621233 A1 | 3/2020 |
| JP | 2017538371 A | 12/2017 |
| WO | 2009/064059 A1 | 5/2009 |
| WO | 2018165347 A1 | 9/2018 |
| WO | 2018172896 A1 | 9/2018 |
| WO | 2018175446 A1 | 9/2018 |
| WO | 2018203722 A1 | 11/2018 |
| WO | 2019027262 A1 | 2/2019 |
| WO | 2019029639 A1 | 2/2019 |
| WO | 2019192583 A1 | 10/2019 |

OTHER PUBLICATIONS

Ericsson, "Uplink HARQ-ACK feedback for MTC," 3GPP TSG-RAN WG1 Meeting #90bis, R1-1716998, Prague, Czech Republic, Oct. 9-13, 2017, 6 pages.

Huawei et al., "Scheduling of multiple transport blocks," 3GPP TSG RAN WG1 Meeting #98bis, R1-1911380, Chongqing, China, Oct. 14-20, 2019, 14 pages.

International Preliminary Report on Patentability issued in International Patent Application No. PCT/CN2020/127557, dated May 10, 2022, 5 pages.

Chinese Notification to Complete Formalities of Registration issued in CN Patent Application No. 202211289218.4, dated Sep. 22, 2023, 7 pages. English translation included.

Japanese office action issued in JP Patent Application No. 2022-526150, dated Feb. 1, 2024, 6 pages. English translation included.

Chinese office action issued in CN Patent Application No. 202211289218.4, dated Jul. 17, 2023, 14 pages. English translation included.

NTT Docomo, Inc., "Study on New Radio Access Technology," 3GPP TSG RAN meeting #75, RP-170376, Dubrovnik, Croatia, Mar. 6-9, 2017, 157 pages.

ZTE, "Consideration on scheduling enhancement for MTC," 3GPP TSG RAN WG1 Meeting #99, R1-19131318, Reno, Nevada, US, Nov. 18-22, 2019, 20 pages.

Japanese office action issued in JP Patent Application No. 2022-526150, dated Aug. 14, 2023, 6 pages. English translation included.

ZTE, "Consideration on scheduling enhancement for MTC," 3GPP TSG RAN WG1 Meeting #98, R1-1908257, Prague, CZ, Aug. 26-30, 2019, 16 pages.

International Search Report and Written Opinion mailed on Jan. 29, 2021 for International Application No. PCT/CN2020/127557, filed on Nov. 9, 2020 (9 pages).

European Search Report issued in EP Patent Application No. 20884738.4, dated Nov. 22, 2023, 12 pages.

Korean notice of allowance issued in KR Patent Application No. 10-2022-7019179, dated May 29, 2024, 8 pages. English translation included.

* cited by examiner

A first communication node sends control information to a second communication node, where the control information is used for indicating scheduling of one or more transport blocks, each transport block corresponds to a respective one of hybrid automatic repeat request (HARQ) processes when being scheduled, and each HARQ process has a corresponding HARQ process index and new data indication (NDI) information ~ S110

FIG. 1

A second communication node receives control information from a first communication node, where the control information is used for indicating scheduling of one or more transport blocks, each transport block corresponds to a respective one of hybrid automatic repeat request (HARQ) processes when being scheduled, and each HARQ process has a corresponding HARQ process index and new data indication (NDI) information ~ S210

FIG. 2

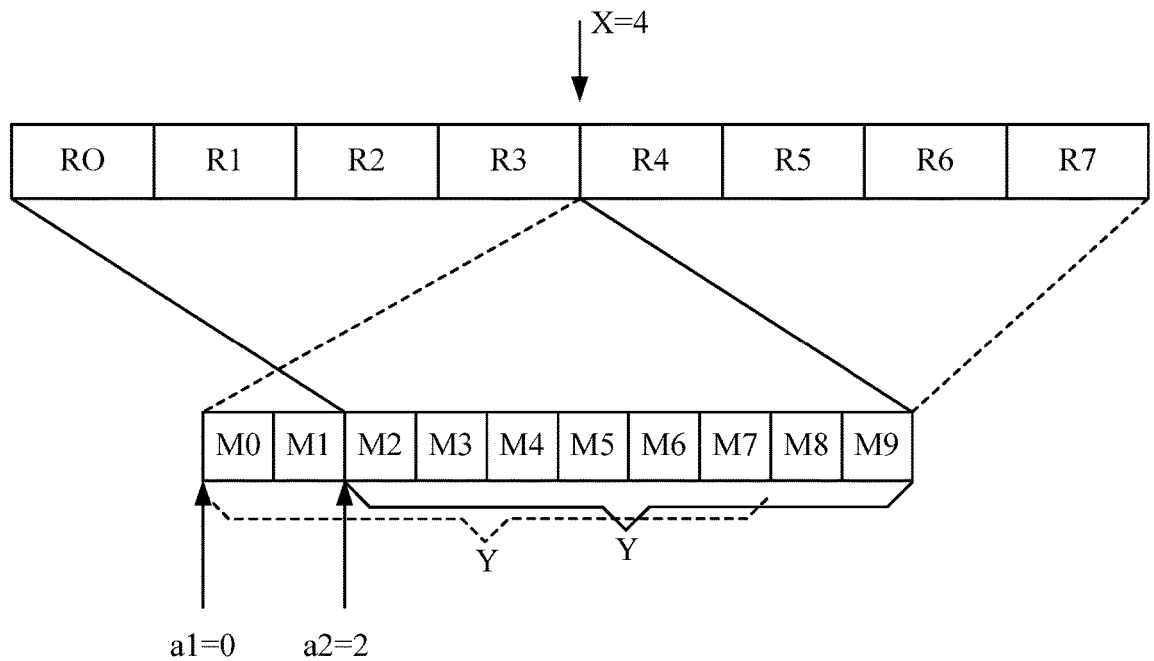
FIG. 3
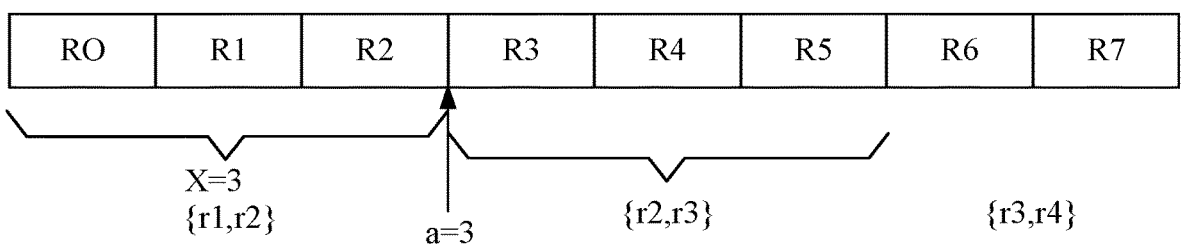
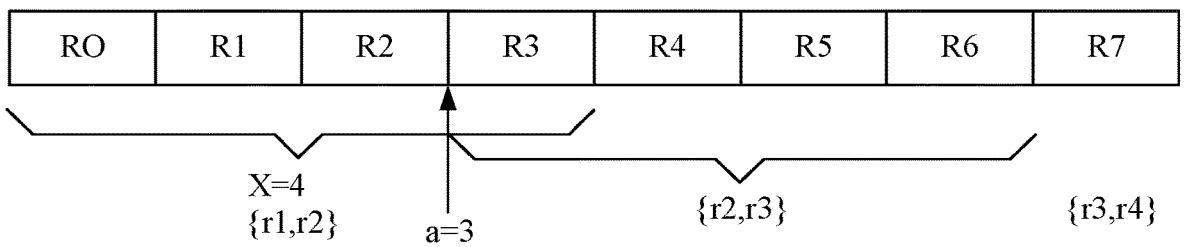
FIG. 4

CONTROL INFORMATION INDICATING METHOD, COMMUNICATION NODE AND COMPUTER READABLE STORAGE MEDIUM

CROSS-REFERENCE TO RELATED APPLICATIONS

This application is a continuation of International Patent Application No. PCT/CN2020/127557, filed on Nov. 9, 2020, which claims priority to Chinese patent application No. 201911089433.8 filed with the China National Intellectual Property Administration (CNIPA) on Nov. 8, 2019, the contents of each of which are incorporated herein by reference in their entirety.

The present application claims the priority of Chinese patent application No. 201911089433.8 filed the China National Intellectual Property Administration (CNIPA) Nov. 8, 2019, the disclosure of which is incorporated herein by reference in its entirety.

TECHNICAL FIELD

The present disclosure relates to radio communication networks, for example, to a control information indicating method, a communication node and a computer-readable storage medium.

BACKGROUND

With the continuous development of wireless communication technology, coverage enhancement (CE) technology has greatly enhanced the coverage depth and capacity performance of user equipment (UE). The connection state of CE includes two coverage modes: CE Mode A and CE Mode B. How to schedule transport blocks (TBs) in these two modes has become the focus of discussion about the future communication system.

SUMMARY

The present application provides a control information indicating method, a communication node and a computer-readable storage medium, which can design the control information of transport block scheduling and improve the flexibility of transport block scheduling.

An embodiment of the present application provides a control information indicating method.

The method includes the following.

A first communication node sends control information to a second communication node, where the control information is used for indicating the scheduling of one or more transport blocks, each transport block corresponds to a respective one of hybrid automatic repeat request (HARQ) processes when being scheduled, and each HARQ process has a corresponding HARQ process index and new data indication (NDI) information.

An embodiment of the present application provides a control information indicating method.

The method includes the following.

A second communication node receives control information from a first communication node, where the control information is used for indicating the scheduling of one or more transport blocks, each transport block corresponds to a respective one of HARQ processes when being scheduled, and each HARQ process has a corresponding HARQ process index and NDI information.

An embodiment of the present application provides a communication node. The communication node includes a processor, which is configured to, when executing a computer program, perform the method in any of the embodiments described above.

An embodiment of the present application further provides a computer-readable storage medium. The computer-readable storage medium is configured to store a computer program which, when executed by a processor, performs the method in any of the embodiments described above.

More description of the above-mentioned embodiments and other aspects of the present application and the implementations thereof is to be provided in the BRIEF DESCRIPTION OF DRAWINGS, DETAILED DESCRIPTION, and claims.

BRIEF DESCRIPTION OF DRAWINGS

FIG. 1 is a flowchart of a control information indicating method according to an embodiment;

FIG. 2 is a flowchart of another control information indicating method according to an embodiment;

FIG. 3 is a schematic diagram of a joint indication (downlink transmission) of an MCS and a repetition number according to an embodiment;

FIG. 4 is a schematic diagram of a DCI repetition number based on a repetition number according to an embodiment;

DETAILED DESCRIPTION

Figure 5:
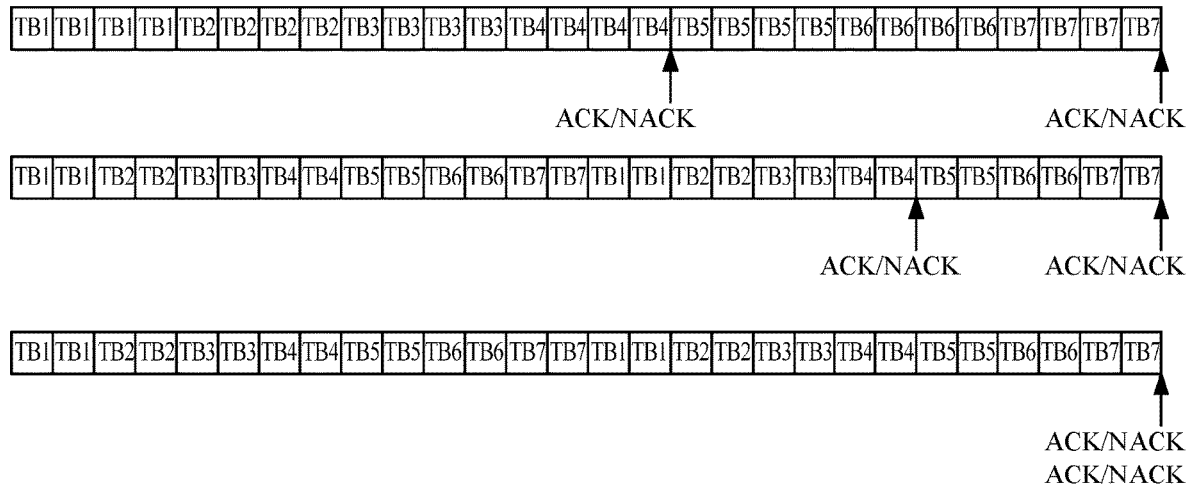
FIG. 5 is a schematic diagram of a relationship between ACK/NACK and TB according to an embodiment.

Embodiments of the present application are described hereinafter in detail in conjunction with the drawings.

With the continuous development of wireless communication technology, in order to enhance both the coverage depth and the capacity performance of the user equipment, the 3rd Generation Partnership Project (3GPP) protocol introduces the CE technology. For the idle state, the idle state is divided into four different coverage levels (CE Levels 0 to 3), and the user equipment in the idle state can choose different coverage levels according to the actual situation. For the connected state, the connected state is divided into two coverage modes: CE Mode A and CE Mode B. There is a corresponding mapping relationship between the coverage levels of the idle state and the coverage modes of the connected state, and the differentiated management of different coverage levels can greatly save the overhead.

For CE Mode A, downlink control information (DCI) generally includes 3 bits of process indication information, 1 bit of NDI information, 1 bit of hopping flag (HF), 2 bits of redundancy version (RV), 2 bits of repetition number (R), 5 bits of resource allocation (RA) domain, and 4 bits of modulation and coding scheme (MCS) information.

For CE Mode B, DCI generally includes 1 bit of process indication information, 1 bit of NDI information, 3 bits of repetition number R, 3 bits of RA domain, and 4 bits of MCS information. Among them, the MCS information and RA domain of uplink transmission are different from the MCS information and RA domain of downlink transmission. For the MCS information of uplink transmission, there are 11 values for indicating modulation and coding information, while for the MCS information of downlink transmission, there are 10 values for indicating modulation and coding information. For the RA domain of uplink transmission, 3 bits are used for indicating one physical resource block (PRB) or two PRBs while for the RA domain of downlink transmission, 1 bit is used for indicating 6 PRBs or 4 PRBs.

In a case where multiple transport blocks need to be scheduled, how to schedule transport blocks flexibly becomes the focus of discussion about the future communication system.

The embodiments of the present application provide a mobile communication network (including but not limited to the 5th-generation mobile communication network (5G)). The network architecture of such a network may include network side devices (for example, one or more types of base stations, transmission nodes, access points (APs), relays, Node B (NB), universal terrestrial radio access (UTRA), evolved universal terrestrial radio access (EU-TRA), and the like) and terminals (user equipments (UEs), user equipment data cards, relays, mobile devices, and the like). In the embodiments of the present application, a control information indicating method operable on the above-mentioned network architecture, a communication node and a computer-readable storage medium are provided, which can design the control information scheduled by transport blocks and improve the flexibility of transport block scheduling.

It is to be noted that each transport block corresponds to one HARQ process when being scheduled, each HARQ process has a corresponding HARQ process index, and each HARQ process corresponds to a shared channel (such as a physical uplink shared channel (PUSCH) or a physical downlink shared channel (PDSCH)). Therefore, the scheduling of transport blocks and the scheduling of processes or the scheduling of shared channels mentioned in the present application can be interchanged or replaced with each other.

The control information indication method, the communication node and technical effects thereof will be described hereinafter.

FIG. 1 is a flowchart of a control information indicating method according to an embodiment. As shown in FIG. 1, the method provided in this embodiment is applicable to a first communication node. The method includes S110.

In S110, a first communication node sends control information to a second communication node, where the control information is used for indicating the scheduling of one or more transport blocks, each transport block corresponds to one HARQ process when being scheduled, and each HARQ process has a corresponding HARQ process index and NDI information.

In an embodiment, the control information includes first indication information, and the control information further includes at least one of second indication information, third indication information, fourth indication information or eighth indication information.

The first indication information is used for indicating the quantity of transport blocks, an HARQ process index corresponding to each transport block, and NDI information corresponding to each transport block.

The second indication information includes an RV, a frequency-hopping (FH), and a repetition number (R).

The third indication information includes sounding reference symbol (SRS) request information, where the SRS request information may also called sounding reference signal (SRS) request information.

The fourth indication information is used for indicating an indicating method; where the indicating method includes a first indicating method and a second indicating method, the first indicating methods indicates that one transport block is scheduled or two transport blocks are scheduled, and the second indicating method indicates that three transport blocks are scheduled or indicates scheduling indicated by an 8-process bitmap. Optionally, the fourth indication information may occupy 1 bit. When the bit is 0, the fourth indication information indicates the first indicating method; when the bit is 1, the fourth indication information indicates the second indicating method. Alternatively, when the bit is 1, the fourth indication information indicates the first indicating method; when the bit is 0, the fourth indication information indicates the second indicating method.

The eighth indication information includes an RV, an FH, an R, and channel state information (CSI) request information.

In an embodiment, the control information includes fifth indication information.

The fifth indication information includes the quantity of HARQ processes, an HARQ process index corresponding to each HARQ process, NDI information corresponding to each HARQ process, and MCS information.

In an embodiment, in a case where the fourth indication information indicates the first indicating method, the first indication information is 7 b its, the second indication information is 4 bits, and the third indication information is 1 bit.

In an embodiment, only in a case where the control information includes the fourth indication information and the fourth indication information indicates the first indicating method, the control information includes the third indication information.

In an embodiment, in a case where the second indication information is 4 bits, the repetition number includes R0, R1, R2, and R3, and R0<R1<R2<R3.

In a case where the repetition number is 1 or R0, the RV has 4 values, and the FH indicates that the frequency-hopping is disabled by default and has 1 value.

In a case where the repetition number is 2 or R1, the RV has 2 or 4 values, and the FH has 2 values.

In a case where the repetition number is greater than 2 or R2 or R3, the RV is fixed at 1 value, and the FH has 2 values.

In a case where the quantity of scheduled transport blocks is 1, the RV is 2 bits; and in a case where the quantity of scheduled transport blocks is 2, each transport block corresponds to a 1-bit RV.

In an embodiment, the control information includes sixth indication information, where the sixth indication information is 6 bits and is described by b(0)b(1)b(2)b(3)b(4)b(5), and the sixth indication information includes at least one of the following characteristics.

b(0) is used for indicating whether one or two HARQ processes are scheduled or three or four HARQ processes are scheduled.

In a case where b(0) is used for indicating that one or two HARQ processes are scheduled, b(1) is used for indicating whether one HARQ process with an index 0, 1, 2 or 3 or two HARQ processes with indexes 01 or 23 are scheduled or two HARQ processes with indexes 02, 03, 12 or 13 are scheduled.

In a case where b(1) is used for indicating whether one HARQ process with an index 0, 1, 2 or 3 or two HARQ processes with indexes 01 or 23 are scheduled, b(2) is used for indicating whether a single process is scheduled or two processes are scheduled; in a case where b(2) indicates that a single process is scheduled, b(3)b(4) indicates a process index 0, 1, 2 or 3 corresponding to the scheduled HARQ process, and b(5) indicates NDI information corresponding to the scheduled HARQ process; and in a case where b(2) indicates that two processes are scheduled, b(3) indicates process indexes 01 or 23 corresponding to the scheduled HARQ processes, and b(4)b(5) indicates NDI information corresponding to the scheduled HARQ processes.

In a case where b(1) is used for indicating that two HARQ processes with indexes 02, 03, 12 or 13 are scheduled, b(2)b(3) indicates process indexes 02, 03, 12 or 13 corresponding to the scheduled HARQ processes, and b(4)b(5) indicates NDI information corresponding to the scheduled HARQ processes.

In a case where b(0) is used for indicating that three or four HARQ processes are scheduled, b(1) is used for indicating whether three HARQ processes are scheduled or four HARQ processes are scheduled; in a case where b(1) indicates that four HARQ processes are scheduled, remaining four bits are used for indicating NDI information of the four processes; and in a case where b(1) indicates that three HARQ processes are scheduled, b(2) indicates whether process indexes corresponding to the scheduled HARQ processes are 012 or 123, and b(3)b(4)b(5) indicates NDI information corresponding to the scheduled HARQ processes.

In an embodiment, the fifth indication information is 10 bits, and the quantity of states of the 10 bits is X or X+1, where X belongs to any one of {800, 880, 960}.

In an embodiment, in a case where three or four transport blocks are scheduled, the fifth indication information is 9 bits; or in a case where one or two transport blocks are scheduled, the fifth indication information is 9 bits, where the MCS information is 3 bits in the 9 bits; or in a case where three or four transport blocks are scheduled, the fifth indication information is 9 bits with an joint indication.

The joint indication (joint coding) refers to the joint coding of multiple domains that are originally coded separately.

In an embodiment, the value of the MCS information is reduced by M, where M belongs to any one of {0, 1, 2}; or in a case where three transport blocks are scheduled, the scheduling of all processes except HARQ processes with indexes 013 is supported (that is, the scheduling of HARQ processes 013 is not supported when three transport blocks are scheduled); or in a case where three transport blocks are scheduled, the scheduling of all processes except HARQ processes with indexes 023 is supported (that is, the scheduling of HARQ processes with indexes 023 are not supported when three transport blocks are scheduled).

In an embodiment, the eighth indication information is 4 bits.

In an embodiment, in a case where bundling is enabled, a method of determining a bundling size of the quantity of bundled transport blocks includes one of the following manners.

The quantity of bundled transport blocks is determined to be $\lceil N/2 \rceil$ and $N-\lceil N/2 \rceil$ by default, where N is the quantity of transport blocks currently scheduled.

The quantity of bundled transport blocks is determined to be $\lfloor N/2 \rfloor$ and $N-\lfloor N/2 \rfloor$ by default, where N is the quantity of transport blocks currently scheduled.

In a case where the number N of scheduled transport blocks is less than or equal to 4, the quantity of bundled transport blocks is determined to be N by default, and in a case where the quantity of scheduled transport blocks is greater than 4, the quantity of bundled transport blocks is determined to be either $\lfloor N/2 \rfloor$ and $N-\lfloor N/2 \rfloor$ or $\lceil N/2 \rceil$ and $N-\lceil N/2 \rceil$.

In a case where the number N of scheduled transport blocks is less than or equal to 4, the quantity of bundled transport blocks is determined to be N by default, and in a case where the quantity of scheduled transport blocks is greater than 4, the quantity of bundled transport blocks is determined to be N and N−4.

In a case where the bundling size is b, the quantity of the transport blocks currently scheduled is divided into $$g = \left\lceil \frac{N}{b} \right\rceil$$

groups, where the first g−1 groups are bundled with b transport blocks and the quantity of processes bundled with the last one group is g*b−N, and the value of b is determined according to a 1-bit bundling size signaling; in a case where the signaling is a first predefined value, b is determined to be 2; and in a case where the signaling is a second predefined value, b is determined to be 4 or that b=$\lceil N/2 \rceil$.

In an embodiment, in a case where an early termination is triggered, a method of triggering the early termination includes one of the following manners.

The early termination is triggered by using a remaining state of a joint indication domain of an HARQ identity (ID), the quantity of transport blocks and the NDI information.

The early termination is triggered by using a remaining state which indicates the HARQ ID or the quantity of transport blocks.

The early termination is triggered by using a remaining state of a joint indication domain of the HARQ ID, the quantity of transport blocks, the NDI information and the MCS information.

In an embodiment, in a case where an early termination is triggered, an early termination method includes one of the following manners.

All transport blocks are terminated.

An HARQ process that needs to be terminated is indicated by using n states or $\log_2(n)$ bits.

One or multiple HARQ processes that needs to be terminated is indicated by using $2^n-1$ states or a manner of an n-bit bitmap.

The termination of a current HARQ process or all currently transmitted HARQ processes is indicated by using 2 states or 1 bit.

In a case where the early termination is triggered, a terminated HARQ process is indicated by using a high bit of a resource allocation domain.

In the above manners, n is the maximum number of scheduled HARQ processes.

In an embodiment, the control information includes an aperiodic CSI trigger information domain.

In a case where the quantity of scheduled transport blocks is greater than 2, the aperiodic CSI trigger information domain is used for indicating process index related information; or in a case where the quantity of scheduled transport blocks is less than or equal to 2, the aperiodic CSI trigger information domain is 1 bit or has 2 values; or in a case where the quantity of scheduled transport blocks is greater than 1, the aperiodic CSI trigger information domain is used for indicating the process index related information; or in a case where the quantity of scheduled transport blocks is equal to 1, the aperiodic CSI trigger information domain is 1 bit or has 2 values; or only in a case where the repetition number is equal to 1, the aperiodic CSI trigger information domain is 1 bit or has 2 values.

In an embodiment, the control information includes seventh indication information.

The seventh indication information includes the quantity of HARQ processes, an HARQ process index corresponding to each HARQ process, NDI information corresponding to each HARQ process, an RV, an FH, an R, and SRS request information.

In an embodiment, in a case where the seventh indication information indicates that one or two transport blocks are scheduled, the RV, the FH, and the R have 16 values or 32 values.

In a case where the seventh indication information indicates that one or two transport blocks are scheduled, the control information includes the SRS request information.

In a case where the seventh indication information indicates that three, four, five, six, seven or eight transport blocks are scheduled, the RV, the FH, and the R have 16 values or 8 values.

In a case where the seventh indication information indicates that predefined four or predefined eight processes are scheduled, the RV, the FH, and the R have 16 values, and the SRS request information has 2 values, where the predefined P processes include at least P processes with continuous process indexes, and P is 4 or 8.

The seventh indication information is 16 bits.

In an embodiment, the quantity of HARQ processes, the HARQ process index, and the NDI information are indicated by using a joint indication method, and an indication state is any possible combination. The any possible combination refers to any possibly scheduled combination.

FIG. 2 is a flowchart of another control information indicating method according to an embodiment. As shown in FIG. 2, the method provided in this embodiment is applicable to a second communication node. The method includes S210.

In S210, a second communication node receives control information from a first communication node, where the control information is used for indicating the scheduling of one or more transport blocks, each transport block corresponds to a respective one of HARQ processes when being scheduled, and each HARQ process has a corresponding HARQ process index and NDI information.

In an embodiment, the control information includes first indication information, and the control information further includes at least one of second indication information, third indication information, fourth indication information or eighth indication information.

The first indication information is used for indicating the quantity of transport blocks, an HARQ process index corresponding to each transport block, and NDI information corresponding to each transport block.

The second indication information includes an RV, an FH, and an R.

The third indication information includes sounding reference symbol (SRS) request information, where the SRS request information may also called sounding reference signal (SRS) request information.

The fourth indication information is used for indicating an indicating method; where the indicating method includes a first indicating method and a second indicating method, the first indicating methods indicates that one transport block is scheduled or two transport blocks are scheduled, and the second indicating method indicates that three transport blocks are scheduled or indicates scheduling indicated by an 8-process bitmap. Optionally, the fourth indication information may occupy 1 bit. When the bit is 0, the fourth indication information indicates the first indicating method; when the bit is 1, the fourth indication information indicates the second indicating method. Alternatively, when the bit is 1, the fourth indication information indicates the first indicating method; when the bit is 0, the fourth indication information indicates the second indicating method.

The eighth indication information includes an RV, an FH, an R, and CSI request information.

In an embodiment, the control information includes fifth indication information.

The fifth indication information includes the quantity of HARQ processes, an HARQ process index corresponding to each HARQ process, NDI information corresponding to each HARQ process, and MCS information.

In an embodiment, in a case where the fourth indication information indicates the first indicating method, the first indication information is 7 bits, the second indication information is 4 bits, and the third indication information is 1 bit.

In an embodiment, only in a case where the control information includes the fourth indication information and the fourth indication information indicates the first indicating method, the control information includes the third indication information.

In an embodiment, in a case where the second indication information is 4 bits, the repetition number includes R0, R1, R2, and R3, and R0<R1<R2<R3.

In a case where the repetition number is 1 or R0, the RV has 4 values, and the FH indicates that the frequency-hopping is disabled by default and has 1 value.

In a case where the repetition number is 2 or R1, the RV has 2 or 4 values, and the FH has 2 values.

In a case where the repetition number is greater than 2 or R2 or R3, the RV is fixed at 1 value, and the FH has 2 values.

In a case where the quantity of scheduled transport blocks is 1, the RV is 2 bits; and in a case where the quantity of scheduled transport blocks is 2, each transport block corresponds to a 1-bit RV.

In an embodiment, the control information includes sixth indication information, where the sixth indication information is 6 bits and is described by b(0)b(1)b(2)b(3)b(4)b(5), and the sixth indication information includes at least one of the following characteristics.

b(0) is used for indicating whether one or two HARQ processes are scheduled or three or four HARQ processes are scheduled.

In a case where b(0) is used for indicating that one or two HARQ processes are scheduled, b(1) is used for indicating whether one HARQ process with an index 0, 1, 2 or 3 or two HARQ processes with indexes 01 or 23 are scheduled or two HARQ processes with indexes 02, 03, 12 or 13 are scheduled.

In a case where b(1) is used for indicating whether one HARQ process with an index 0, 1, 2 or 3 or two HARQ processes with indexes 01 or 23 are scheduled, b(2) is used for indicating whether a single process is scheduled or two processes are scheduled; in a case where b(2) indicates that a single process is scheduled, b(3)b(4) indicates a process index 0, 1, 2 or 3 corresponding to the scheduled HARQ process, and b(5) indicates NDI information corresponding to the scheduled HARQ process; and in a case where b(2) indicates that two processes are scheduled, b(3) indicates process indexes 01 or 23 corresponding to the scheduled HARQ processes, and b(4)b(5) indicates NDI information corresponding to the scheduled HARQ processes.

In a case where b(1) is used for indicating that two HARQ processes with indexes 02, 03, 12 or 13 are scheduled, b(2)b(3) indicates process indexes 02, 03, 12 or 13 corresponding to the scheduled HARQ processes, and b(4)b(5) indicates NDI information corresponding to the scheduled HARQ processes.

In a case where b(0) is used for indicating that three or four HARQ processes are scheduled, b(1) is used for indicating whether three HARQ processes are scheduled or four HARQ processes are scheduled; in a case where b(1) indicates that four HARQ processes are scheduled, remaining four bits are used for indicating NDI information of the four processes; and in a case where b(1) indicates that three HARQ processes are scheduled, b(2) indicates whether process indexes corresponding to the scheduled HARQ processes are 012 or 123, and b(3)b(4)b(5) indicates NDI information corresponding to the scheduled HARQ processes.

In an embodiment, the fifth indication information is 10 bits, and the quantity of states of the 10 bits is X or X+1, where X belongs to any one of {800, 880, 960}.

In an embodiment, in a case where three or four transport blocks are scheduled, the fifth indication information is 9 bits; or in a case where one or two transport blocks are scheduled, the fifth indication information is 9 bits, where the MCS information is 3 bits in the 9 bits; or in a case where three or four transport blocks are scheduled, the fifth indication information is 9 bits with an joint indication.

The joint indication (joint coding) refers to the joint coding of multiple domains that are originally coded separately, and the value of each code may correspond to the scheduling state of one specific related domain.

In an embodiment, the value of the MCS information is reduced by M, where M belongs to any one of {0, 1, 2}; or in a case where three transport blocks are scheduled, the scheduling of all processes except HARQ processes 013 is supported (that is, the scheduling of HARQ processes 013 is not supported when three transport blocks are scheduled); or in a case where three transport blocks are scheduled, the scheduling of all processes except HARQ processes 023 is supported (that is, the scheduling of HARQ processes 023 is not supported when three transport blocks are scheduled).

In an embodiment, the eighth indication information is 4 bits.

In an embodiment, in a case where bundling is enabled, a method of determining a bundling size of the quantity of bundled transport blocks includes one of the following manners.

The quantity of bundled transport blocks is determined to be $\lceil N/2 \rceil$ and $N-\lceil N/2 \rceil$ by default, where N is the quantity of transport blocks currently scheduled.

The quantity of bundled transport blocks is determined to be $\lfloor N/2 \rfloor$ and $N-\lfloor N/2 \rfloor$ by default, where N is the quantity of transport blocks currently scheduled.

In a case where the number N of scheduled transport blocks is less than or equal to 4, the quantity of bundled transport blocks is determined to be N by default, and in a case where the quantity of scheduled transport blocks is greater than 4, the quantity of bundled transport blocks is determined to be either $\lfloor N/2 \rfloor$ and $N-\lfloor N/2 \rfloor$ or $\lceil N/2 \rceil$ and $N-\lceil N/2 \rceil$.

In a case where the number N of scheduled transport blocks is less than or equal to 4, the quantity of bundled transport blocks is determined to be N by default, and in a case where the quantity of scheduled transport blocks is greater than 4, the quantity of bundled transport blocks is determined to be N and N−4.

In a case where the bundling size is b, the quantity of the transport blocks currently scheduled is divided into $$g = \left\lceil \frac{N}{b} \right\rceil$$

groups, where the first g−1 groups are bundled with b transport blocks and the quantity of processes bundled with the last one group is g*b−N, and the value of b is determined according to a 1-bit bundling size signaling; in a case where the signaling is a first predefined value, b is determined to be 2; and in a case where the signaling is a second predefined value, b is determined to be 4 or that $b = \lceil N/2 \rceil$.

In an embodiment, in a case where an early termination is triggered, a method of triggering the early termination includes one of the following manners.

The early termination is triggered by using a remaining state of a joint indication domain of an HARQ ID, the quantity of transport blocks and the NDI information.

The early termination is triggered by using a remaining state which indicates the HARQ ID or the quantity of transport blocks.

The early termination is triggered by using a remaining state of a joint indication domain of the HARQ ID, the quantity of transport blocks, the NDI information and the MCS information.

In an embodiment, in a case where an early termination is triggered, an early termination method includes one of the following manners.

All transport blocks are terminated.

An HARQ process that needs to be terminated is indicated by using n states or log$_2$(n) bits.

One HARQ process or multiple HARQ processes that need to be terminated are indicated by using 2^n−1 states or a manner of an n-bit bitmap.

The termination of a current HARQ process or all currently transmitted HARQ processes is indicated by using 2 states or 1 bit.

In a case where the early termination is triggered, a terminated HARQ process is indicated by using a high bit of a resource allocation domain.

In the above manners, n is the maximum number of scheduled HARQ processes.

In an embodiment, the control information includes an aperiodic CSI trigger information domain.

In a case where the quantity of scheduled transport blocks is greater than 2, the aperiodic CSI trigger information domain is used for indicating process index related information; or in a case where the quantity of scheduled transport blocks is less than or equal to 2, the aperiodic CSI trigger information domain is 1 bit or has 2 values; or in a case where the quantity of scheduled transport blocks is greater than 1, the aperiodic CSI trigger information domain is used for indicating the process index related information; or in a case where the quantity of scheduled transport blocks is equal to 1, the aperiodic CSI trigger information domain is 1 bit or has 2 values; or only in a case where the repetition number is equal to 1, the aperiodic CSI trigger information domain is 1 bit or has 2 values.

In an embodiment, the control information includes seventh indication information.

The seventh indication information includes the quantity of HARQ processes, an HARQ process index corresponding to each HARQ process, NDI information corresponding to each HARQ process, an RV, an FH, an R, and SRS request information.

In an embodiment, in a case where the seventh indication information indicates that one or two transport blocks are scheduled, the RV, the FH, and the R have 16 values or 32 values.

In a case where the seventh indication information indicates that one or two transport blocks are scheduled, the control information includes the SRS request information.

In a case where the seventh indication information indicates that three, four, five, six, seven or eight transport blocks are scheduled, the RV, the FH, and the R have 16 values or 8 values.

In a case where the seventh indication information indicates that predefined four or predefined eight processes are scheduled, the RV, the FH, and the R have 16 values, and the SRS request information has 2 values, where the predefined P processes include at least P processes with continuous process indexes, and P is 4 or 8.

The seventh indication information is 16 bits.

In an embodiment, the quantity of HARQ processes, the HARQ process index, and the NDI information are indicated by using a joint indication method, and an indication state is any possible combination. The any possible combination refers to any possibly scheduled combination.

It is to be noted that the combination mentioned in the embodiments of the present application may mean that any m (m≤n) elements from n different elements is combined into a group, which is called a combination of m elements from n different elements. The element in the embodiments of the present application may refer to the process index.

Some example embodiments are listed below to illustrate the control information indicating method provided by the embodiments of the present application. The following example embodiments may be performed alone or in combination with each other, which is not limited in embodiments of the present application.

In an embodiment, when the quantity of scheduled transport blocks is 1 or 2, the scheduling mode of the transport blocks is full flexibility scheduling. The full flexibility scheduling means that in when a number X of transport blocks are scheduled, numbers of any X HARQ processes may be randomly combined, and the NDI information corresponding to any X HARQ processes is indicated.

In one case, the full flexibility scheduling of one or two transport blocks may be expressed in a form of formulas.

The quantity of scheduled HARQ processes (hereinafter referred to as processes) is h, the maximum number of processes is H, a first scheduled process is process i, a second scheduled process is process j, where i<j, and i is 0, 1, 2, ..., and H−h. In addition, N(i) represents the NDI value of process i, and a state number is M.

When h=1, M=2i+N(i).
When h=2, $$M = 2H + 2^2\left(\sum_{p=0}^{i-1}(H-1-p)+j-i-1\right)+2^*N(i)+N(j).$$

Further, the upper triangular matrix is defined as $$U = \begin{bmatrix} u_{1,1} & u_{1,2} & \cdots & u_{1,H} & u_{1,H} \\ 0 & u_{22} & u_{23} & \cdots & u_{2,H} \\ 0 & 0 & \cdots & u_{i,j} & \cdots \\ 0 & 0 & 0 & u_{H-1,H-1} & u_{H-1,H} \\ 0 & 0 & 0 & 0 & u_{H,H} \end{bmatrix}.$$

In the upper triangular matrix, the diagonal element is 2, which represents the quantity of states of the scheduling of a single process, and the other non-0 elements are $2^2=4$. $u_{i,j}$ represents the quantity of states contained when the $i^{th}$ process (whose process index is i−1) and the $j^{th}$ process (whose process index is j−1) are scheduled.

Therefore, when the $i^{th}$ process (whose process index is i−1) and the $j^{th}$ process (whose process index is j−1) are scheduled, M which refers to the state number is:

$$M = \sum_{q=1}^{H}\sum_{p=1}^{i-1} u_{p,q} + \sum_{m=1}^{j-1} u_{i,m} + X, \begin{cases} i=j, X=N(i) \\ i \neq j, X=2*N(i)+N(j) \end{cases}.$$

The summation symbol in the above formula may be expressed as a matrix:

$$M=[A^*U+B^*U^*C]^*D+X=M_1D+X$$

In the above matrix, A is the row vector of 1*H, where the first i−1 column is 1, and the rest are 0; B is the row vector of 1*H, where the $i^{th}$ column is 1, and the rest are 0; C is an H*H matrix, where first j−1 elements on the diagonal is 1, and all other elements are 0; and D is all 1 column vector with a dimension of H*1. The above matrix may specifically be expressed as:

$$M_1 = \begin{bmatrix} 1 & 1 & i-1 & 0 \end{bmatrix} \begin{bmatrix} u_{1,1} & u_{1,2} & \cdots & u_{1,H} & u_{1,H} \\ 0 & u_{22} & u_{23} & \cdots & u_{2,H} \\ 0 & 0 & \cdots & u_{i,j} & \cdots \\ 0 & 0 & 0 & u_{H-1,H-1} & u_{H-1,H} \\ 0 & 0 & 0 & 0 & u_{H,H} \end{bmatrix} +$$

$$\begin{bmatrix} 0 & 0 & i & 0 \end{bmatrix} * U * \begin{bmatrix} 1 & 0 & \cdots & 0 & 0 \\ 0 & 1 & 0 & \cdots & 0 \\ 0 & 0 & \cdots & 0 & \cdots \\ 0 & 0 & 0 & j-1 & 0 \\ 0 & 0 & 0 & 0 & 0 \end{bmatrix}.$$

For example, when H=4, the quantity of the scheduled process is 3,3, that is, the fourth process and the fourth process, and at this point, the number is maximum i=j=4.

$$M_1 = \begin{bmatrix} 1 & 1 & 1 & 0 \end{bmatrix} \begin{bmatrix} 2 & 4 & 4 & 4 \\ 0 & 2 & 4 & 4 \\ 0 & 0 & 2 & 4 \\ 0 & 0 & 0 & 2 \end{bmatrix} + \begin{bmatrix} 0 & 0 & 0 & 1 \end{bmatrix} * \begin{bmatrix} 2 & 4 & 4 & 4 \\ 0 & 2 & 4 & 4 \\ 0 & 0 & 2 & 4 \\ 0 & 0 & 0 & 2 \end{bmatrix} * \begin{bmatrix} 1 & 0 & 0 & 0 \\ 0 & 1 & 0 & 0 \\ 0 & 0 & 1 & 0 \\ 0 & 0 & 0 & 0 \end{bmatrix} + NA \quad (4)$$

$$= \begin{bmatrix} 2 \\ 4+2 \\ 4+4+2 \\ 4+4+4 \end{bmatrix} + [0\ 0\ 0\ 1] * \begin{bmatrix} 2 & 4 & 4 & 4 \\ 0 & 2 & 4 & 4 \\ 0 & 0 & 2 & 4 \\ 0 & 0 & 0 & 2 \end{bmatrix}$$

$$= \begin{bmatrix} 2 \\ 6 \\ 10 \\ 12 \end{bmatrix}$$

2+6+10+12=30, that is, according to NDI=0 or 1, M of process 3 is determined to be 30 or 31.

In another case, the full flexibility scheduling of one or two transport blocks may be represented by structured representation, where the following Tables 1 to 4 are four different structured representation solutions.

TABLE 1

| 1 bit | 1 bit | 1 bit | 1 bit | 1 bit | 1 bit | 1 bit |
|---|---|---|---|---|---|---|
| 1 TB & part of 2 TBs (including 01, 12, 23, 34, 45, 56, 67, 70 and 04, 15, 26, 37) | 2 bits indicate a single TB or 01, 23, 45, 67 or 12, 34, 56, 70 or 04, 15, 26, 37 | | Single process indication with 3 bits | | | NDI |
| | | | Select 01, 23, 45 or 67 | | | 2-bit NDI |
| | | | Select 12, 34, 56 or 70 | | | 2-bit NDI |
| | | | Select 04, 15, 26 or 37 | | | 2-bit NDI |
| Indication of remaining two processes | 4 bits indicates indexes of two processes | | | | | 2-bit NDI |

As shown in Table 1, the structured representation solution adopts 7 bits for indication. For example, if the indication indicates the scheduling of a single process, the first bit indicates that the scheduling is the scheduling of one transport block or part of two transport blocks, the second to sixth bits all indicate that the scheduling is the scheduling of a single process, and the seventh bit indicates the NDI information corresponding to the scheduled process.

TABLE 2

| 1 bit | 1 bit | 1 bit | 1 bit | 1 bit | 1 bit | 1 bit | 1 bit |
|---|---|---|---|---|---|---|---|
| 1 TB & 2 TBs | HARQ ID1 | | | HARQ ID2 | | | If ID1 = ID2, 1-bit NDI is used for indicating a single process; if ID1 < ID2, the NDI of the first and second processes is 0; if ID1 > ID2, the NDI of the first and second processes is 1. |

TABLE 3

| 1 bit | 1 bit | 1 bit | 1 bit | 1 bit | 1 bit |
|---|---|---|---|---|---|
| 1 TB & 2 TBs | HARQ ID1 | | HARQ ID2 | | If ID1 = ID2, 1-bit NDI is used for indicating a single process; if ID1 < ID2, the NDI of the first and second processes is 0; if ID1 > ID2, the NDI of the first and second processes is 1. |

TABLE 4

| a | b(0) | b(1) | b(2) | b(3) | b(4) |
|---|---|---|---|---|---|
| 1 TB & 2 TBs | Single process and processes with indexes 01 or 23 | Single process with indexes 01 and 23 | Single process | | NDI |
| | | | Select 01 or 23 | | 2-bit NDI |
| | Processes with indexes 02, 03, 13 or 12 | | Select 02, 03, 12 or 13 | | 2-bit NDI |

In an embodiment, on the premise of configuring the multi-transport block scheduling function and ensuring certain scheduling flexibility, corresponding compression methods may be selected for different domains of the DCI. The compression method includes at least one of the following seven methods.

Method one: the RV and the FH may be compressed into 1 bit, which is reduced by 2 bits compared with the quantity of bits occupied by the conventional RV and FH.

When the repetition number is 1, the RV is indicated by 1 bit, and the FH indicates that the frequency-hopping is disabled; when the repetition number is greater than 1, the FH is indicated by 1 bit, and the RV is fixed at one value. At this point, the RV, the FH and the repetition number R occupy a total of 3 bits.

Method two: when pusch-maxNumRepetitionCEmodeA or pdsch-maxNumRepetitionCEmodeA has been configured, the repetition number is any one of {1, 4, 8, 16} or any one of {1, 4, 16, 32}, and at this point, the compression manner of one of the above method may be used. When pusch-maxNumRepetitionCEmodeA or pdsch-maxNum-RepetitionCEmodeA is not configured and the repetition number is any one of {1, 2, 4, 8}, the indicating method includes:

when the repetition number is 1, the RV is indicated by 2 bits, and the FH is not indicated; when the repetition number is 2, the RV is indicated by 1 bit or 2 bits, and the FH is indicated by 1 bit; when the repetition number is 4 or greater than 4, the RV is fixed at one value, and the FH is indicated by 1 bit.

In a case where the repetition number is {1, 2, 4, 8}, there are at total of 4+4+4=12 or 4+8+4=16 states, and FH+RV+R is indicated by 4 bits, which is reduced by 1 bit compared with the original bits; in a case where the repetition number is {1, 4, 8, 16} or {1, 4, 16, 32}, there are a total of 4+6=10 states, and FH+RV+R is indicated by 4 bits, which is reduced by 1 bit compared with the original bits and is expressed as FH+RV+R=4.

When the repetition number is set to {R0, R1, R2, R3} and R0<R1<R2<R3, there are following three cases.

When the repetition number R0=1, the RV has 4 values and the FH has 1 value.

When the repetition number is R1, the RV has 2 or 4 values, and the FH has 2 values.

When the repetition number is R2 or R3, the RV is fixed at 1 value, and the FH has 2 values.

In summary, there are a total of 4+4+4=12 values or 4+8+4=16 values. In order to ensure the flexibility of R1, the solution having 16 values is more appropriate, and at this point, that the FH+RV+R is indicated by 4 bits is also expressed as FH+RV+R=4.

Further, the case of FH+RV+R+CSI=4 may also need to be considered.

When the repetition number R0=1, the RV has 4 values, the FH has 1 value, and the CSI has 2 values.

When the repetition number is R1, the RV has 2 values, the FH has 2 values, and the CSI is not used or has 1 value.

When the repetition number is R2 or R3, the RV is fixed at 1 value, the FH has 2 values, and the CSI is not used or may have 1 value.

In summary, there are a total of 8+4+4=16 values.

Method three: an SRS domain/CSI domain is compressed.

For the scheduling of at least one of 1 TB and 2 TBs, the support for an aperiodic SRS domain/CSI 1 bit domain is maintained, or the CSI request is supported only when the repetition number is 1.

For the full flexibility scheduling of more than 1 TB or more than 2 TBs or non-indicated 1 TB and 2 TBs, 1 bit of the aperiodic SRS domain/CSI domain is used for indicating other information indications, such as indication used for process scheduling, NDI information indications, MCS information indications, and the like.

For example, there is an example as shown in Table 5.

TABLE 5

| b0 | b1 | b9 | 1 |
|---|---|---|---|
| 1 TB & 2 TBs other | 10 bits indicate a mixed schedule 7 bits indicate 1 TB & 2 TBs others | RV + FH + R = 4 or RV + FH + R + CSI = 4 | FH + RV + R = 3 SRS domain/CSI FH + RV + R = 3 |

Method four: the DCI subframe repetition number is indicated based on the repetition time.

The DCI subframe repetition number is indicated by 1 bit based on different repetition numbers. For example, using a sliding correspondence method, the repetition number of repetition pairs are set as the set element number X=2 and the offset value a=1, and four repetition numbers satisfy the condition: 2+n*1≤4, where n may include three values: 0, 1 and 2. For the DCI repetition number, the set element Y is 2, the starting value is r1, the offset value a2 is 1, and then the corresponding sets obtained are {r1, r2}, {r2, r3} and {r3, r4}. If the repetition number set is set to {R0, R1, R2, R3}, then R0 and R1 correspond to 1-bit indication {r1, r2}, R1 and R2 correspond to 1-bit indication {r2, r3}, and R2 and R3 correspond to 1-bit indication {r3, r4}.

Compared with the conventional method, this method can save 1 bit.

Method five: RV compression method.

There are two main RV compression methods, that is, when the quantity of TBs is greater than N or when the repetition number of TBs is greater than N, the RV of the TB is fixed at one value.

There are two main manners to make the RV be fixed at one value. One manner is that the RV is used as a common parameter, and all TBs adopt the same RV that is cyclically numbered in a certain order or fixed as a certain RV, for example, RV0. The other manner is that each TB changes cyclically according to its own RV version.

When the repetition number is 1 and the quantity of scheduled TBs is 1 or 2, the RV is indicated by 2 bits. In the scheduling of 2 TBs, the RV may be indicated as a common parameter, or each TB may be indicated by 1 bit.

When the repetition number is 1 and the quantity of scheduled TBs is 3 to 8, the RV is indicated by 1 bit as a common parameter, or the RV is fixed at one value.

When the repetition number is greater than 2 and the quantity of scheduled TBs is uncertain (for example, 1 to 8), the RV is indicated by a fixed manner or indicated by 1 bit as a common parameter.

When the repetition number is 2 and the quantity of scheduled TBs is 1 or 2, the RV may be indicated by 1 bit as a common parameter, or may be fixed at one value, or may be indicated by 2 bits, which includes that the RV may be indicated as a common parameter or that each TB may be indicated by 1 bit.

When the repetition number is 2 and the quantity of scheduled TBs is 3 to 8, the RV may be indicated by 1 bit as a common parameter, or the RV is fixed at one value.

Method six: for CE Mode B, the MCS information may be compressed into 3 bits.

TABLE 6

| MCS Index $I_{MCS}$ | TBS Index $I_{TBS}$ | MCS Index $I_{MCS}$ | TBS Index $I_{TBS}$ |
|---|---|---|---|
| 0 | 0 | 0 | 0 |
| 2 | 2 | 2 | 2 |
| 3 | 3 | 3 | 3 |
| 4 | 4 | 4 | 4 |
| 6 | 6 | 6 | 6 |
| 7 | 7 | 7 | 7 |
| 8 | 8 | 8 | 8 |
|   |   | 9 | 9 |
| 10 | 9 |   | downlink |
| uplink |   |   |   |

As shown in Table 6, the blank part in Table 6 is the culled part. According to a certain arithmetic law, 3 MCS indexes ($I_{MCS}$) are culled in the uplink and 2 MCS indexes ($I_{MCS}$) are culled in the downlink. Alternatively, as shown in Table 7 below, the uplink $I_{MCS}=10$ is culled, and the other two culled MCS indexes ($I_{MCS}$) in the uplink are the same as those in the downlink.

TABLE 7

| MCS Index $I_{MCS}$ | TBS Index $I_{TBS}$ | MCS Index $I_{MCS}$ | TBS Index $I_{TBS}$ |
|---|---|---|---|
| 2 | 2 | 2 | 2 |
| 3 | 3 | 3 | 3 |
| 4 | 4 | 4 | 4 |
| 5 | 5 | 5 | 5 |
| 6 | 6 | 6 | 6 |
| 7 | 7 | 7 | 7 |
| 8 | 8 | 8 | 8 |
| 9 | 9 | 9 | 9 |
|   |   |   | downlink |
| uplink |   |   |   |

Method Seven:

When the quantity of scheduled transport blocks is greater than 2, the aperiodic CSI trigger information domain is used for indicating process ID related information; or when the quantity of scheduled transport blocks is less than or equal to 2, the aperiodic CSI trigger information domain is 1 bit; or when the quantity of scheduled transport blocks is greater than 1, the aperiodic CSI trigger information domain is used for indicating the process ID related information; or when the quantity of scheduled transport blocks is equal to 1, the aperiodic CSI trigger information domain is 1 bit.

In an embodiment, for CE mode A, when the quantity of processes supported by the 8 processes is 1, 2, 4, 6, or 8 processes, all combined states are supported. For example, when 6 processes are scheduled, the quantity of states is $C_8^6 * 2^6$, when 8 processes are scheduled, the quantity of states is $2^8$, so the scheduling of 6 TBs and 8 TBs has a total of 2048 states and is jointly indicated with 11 bits.

Specifically, the DCI size with 6 bits may be increased, as shown in Table 8.

TABLE 8

| 1 bit | 1 bit | 1 bit | 1 bit | 1 bit | 1 bit | 1 bit | 1 bit | 1 bit | 1 bit | 1 bit | 1 bit |
|---|---|---|---|---|---|---|---|---|---|---|---|
| 6 TBs & 8 TBs | Joint indication with 11 bits (256 + 1792 = 2048) | | | | | | | | | | |
| 1 TB, 2 TBs, and 4 TBs | 4 TBs are non-full flexibility while 1 TB & 2 TBs are full flexibility | 6 bits indicate the locations of a single TB, 2 TBs, and 4 TBs, 8 locations for a single TB, 28 locations for 2 TBs, and 8 cyclically continuous indexes for 4 TBs. | | | | | | Single TB NDI | 2-bit RV | | |
|  |  |  | | | | | | NDI of 2 TBs | 1-bit RV | 1-bit RV | |
|  |  |  | | | | | | 4-TB NDI indication | | | |
| Remaining four processes | 6 bits indicate 62 4-process indexes | | | | | | | 4-bit NDI | | | |

When two processes are scheduled, the selected processes include: 01, 02, 03, 04, 05, 06, 07, 12, 13, 14, 15, 16, 17, 23, 24, 25, 26, 27, 34, 35, 36, 37, 45, 46, 47, 56, 57 or 67.

When four processes are scheduled, the selected processes are cycled by 1 bit: 0123, 1234, 2345, 3456, 4567, 5670, 6701, or 7012, which is called the 7012 bit cyclically continuous indexes. Of course, more locations of 4 TBs may also be selected, up to 28 states.

The method may be described as: 1 bit indicates the scheduling of 6 and 8 processes or the scheduling of 1, 2 and 4 processes; when 1 bit indicates the scheduling of 6 and 8 processes, a joint indication with 11 bits is adopted. When 1 bit indicates the scheduling of 1, 2 and 4 processes, 1 bit distinguishes the scheduling of 1 process, 2 processes and part 4 processes or the scheduling of remaining 4 processes; when 1 bit indicates the scheduling of remaining 4 processes, 10 bits are used for joint indication, or 4 bits of 10 bits are NDI indication and the remaining 6 bits of the 10 bits indicate the indexes of 4 processes. When 1 bit indicates the scheduling of 1 process, 2 processes and part 4 processes, 6 bits indicates locations of a single TB, 2 TBs, or 4 selected TBs. When 6 bits indicate a single TB, an additional 1-bit NDI and 2-bit RV are required. When 6 bits indicate 2 TBs, 2-bit NDI and 1-bit RV are required. When 6 bits indicate 4 selected TBs, the RV is 4 bits and RV is fixed at one value.

Based on the above solutions, when the quantity of scheduled TBs is 4 or greater than 4, other domains are compressed into 1 bit, for example, the repetition number and the MCS are compressed into 1 bit, so that the DCI size is increased by only 5 bits compared with the conventional manner.

A total of 992+2048+8*8+28*4*2*2+8*2^4=3680 cases are indicated.

In the scheduling of 2 TBs, 2 TBs may share 2 bits of the RV, or each TB may correspond to the indication of a 1-bit RV.

Further specifically, the DCI size with 5 bits may be increased, that is, whether a structured method or a joint indication method is used, the DCI size may be saved by 1 bit of SRS request information, as shown in Table 9.

Further, the repetition number is listed as a set {R0, R1, R2, R3}, and the MCS values corresponding to R0 are 9 maximum MCS values that correspond to [7, 15] in the all MCS values, then the MCS values corresponding to R1 shifts to the left by 1 bit and become [6, 14], and so on. The MCS values corresponding to R2 are [5, 13], and the MCS values corresponding to R3 are [4, 12]. The general trend is that the greater the repetition number, the smaller the corresponding MCS values or the corresponding MCS values are equal.

In an embodiment, for CE mode A, 11 bits indicate the NDI of the process, the quantity of processes, and location information. When the first bit indicates 0 (or 1), it represents continuous mixed scheduling, including a single process. The remaining 10 bits b(0) to b(9) indicating method is as follows: b(i) which is the first one to be set to 1 among the 10 bits is the process starting location H(i), b(j) which is the second one to be set to 1 represents that the quantity of scheduled TBs is 9−j, and the subsequent b(j+1) to b(9) are

TABLE 9

| 1 bit | 1 bit | 1 bit | 1 bit | 1 bit | 1 bit | 1 bit | 1 bit | 1 bit | 1 bit | 1 bit | 1 bit |
|---|---|---|---|---|---|---|---|---|---|---|---|
| 6 TBs & 8 TBs | | Joint coding with 11 bits (256 + 1792 = 2048) | | | | | | | | | |
| 1 TB, 2 TBs, and 4 TBs | 4 TBs are non-full flexibility while 1 TB & 2 TBs are full flexibility | 6 bits indicate locations of a single TB, 2 TBs, and 4 TBs, 8 locations for a single TB, 28 locations for 2 TBs, and 8 cyclically continuous indexes for 4 TBs. | | | | | | Single TB NDI 2-TB NDI | 2-bit RV 1-bit RV 4-TB NDI indication | 1-bit RV | SRS |
| Remaining four processes | | 6 bits indicate 62 4-process indexes | | | | | | | 4-bit NDI | | |

When the joint indication is adopted, the SRS request information may be supported in the state of the scheduling of a single TB but not in the state of the scheduling of other TBs.

In addition, based on the repetition number, the FH and MCS domains are jointly indicated and compressed, and 1 bit may be reduced, so that the DCI size is increased by only 4 bits compared with the conventional DCI size.

For CE mode A, the FH and the MCS may be compressed based on the repetition number. The RA is not subjected to compression or joint indication. The compression method is as follows.

the NDI of 9−j processes. b(0) to b(9) may indicate continuous processes 1 to 8 or a part of these processes.

Optionally, b(0) to b(9) may also be described as: when 9−j processes are scheduled and the starting process location is i, b(i) and b(j) are set to 1, and the other first j bits are set to 0. The remaining 9−j bits are the bitmap of the process NDI.

Specifically, the DCI size with 6 bits may be increased.

When the first bit indicates 1 (or 0), if the fully flexibility scheduling of 1 and 2 processes need to be indicated, 7 bits are required, as shown in Table 10.

TABLE 10

| 1 bit | 1 bit | 1 bit | 1 bit | 1 bit | 1 bit | 1 bit | 1 bit | 1 bit | 1 bit | 1 bit | 1 bit | 1 bit | 1 bit |
|---|---|---|---|---|---|---|---|---|---|---|---|---|---|
| Mixed scheduling | | Mixed scheduling of continuous processes supported by 10 bits | | | | | | | | | FH + RV + R = 3 | | |
| Reserved | 1 TB & 2 TBs | Full flexibility | | | | | | | | | RV | FH | Repetition number |

When the repetition number is R0=1, the FH indicates that the frequency-hopping is disabled by default, and the MCS are X continuous values with a larger index in the all MCS values.

When the repetition number is R>R0, the FH indicates that the frequency-hopping is disabled by 2 values, and the MCS are X continuous values with a little larger index in the all MCS values, where X is 9.

1 bit that is reserved may be used for indicating the SRS/CSI domain in the scheduling of 1 TB and 2 TBs, 1 bit of the SRS/CSI domain is used for indicating the scheduling of processes or indicating FH+RV+repetition number in the mixed scheduling, and at this point, the DCI size is increased by only 4 bits.

When the first bit indicates 1 (or 0) and the scheduling of 1 TB to 3 TBs is indicated, the case is as shown in Table 11 below.

TABLE 11

| | b0 | b1 | b2 | | b9 | 1 | |
|---|---|---|---|---|---|---|---|
| | | 10 bits indicate a mixed schedule | | | | FH + RV + R = 3 | |
| 1 TB & 2 TBs | | 7 bits indicate 1 TB & 2 TBs | | RV | | FH | Repetition number |
| 3 TBs | | 6 bits indicate locations of 3 processes | | NDI | | FH + RV + R = 3 | |

Because the scheduling of 3 TBs has a total of $C_8^3 * 2^3 = 56 * 2^3$ states, 9 bits may be adopted for indication. The full flexibility method of indicating 1 TB and 2 TBs with 7 bits mainly includes the methods described in the above embodiments, and the 2 bits of the RV have different meanings for a single TB and 2 TBs. For the scheduling of a single TB, the 2-bit RV indicates four states, and for the scheduling of 2 TBs, the 2-bit RV may be a common parameter, and each TB adopts 1 bit to indicate two RVs. The above explanation about 1 TB and 2 TBs is suitable for each full flexibility indicating method involving 1 TB and 2 TBs.

In addition, when the 10 bits indicate the mixed scheduling, besides the scheduling of 1 to 8 processes, only the scheduling of 4 to 8 processes may be indicated. At this point, it is difficult to unify the RV of each TB, so that the RV domain is a 0-bit indication to make the RV be fixed at one value, and FH+R=3.

When the first bit indicates 1 (or 0) and the scheduling of 1 to 4 TBs is indicated, the case is as shown in Table 12 or Table 13 below.

TABLE 12

| 1 bit | 1 bit | 1 bit | 1 bit | 1 bit | 1 bit | 1 bit | 1 bit | 1 bit | 1 bit | 1 bit | 1 bit | 1 bit | 1 bit |
|---|---|---|---|---|---|---|---|---|---|---|---|---|---|
| Mixed scheduling | Mixed scheduling of continuous processes supported by 10 bits | | | | | | | | | FH + RV + R = 3 | | | |
| 3 TBs & 4 TBs | 4 TB | 4 bits indicate indexes of 4 processes | | | | | | | NDI | FH + RV + R = 3 | | | |
| | 3 TB | 5 bits indicate indexes of 3 processes | | | | | | | NDI | FH + RV + R = 3 | | | |
| 1 TB & 2 TBs | | Full flexibility | | | | | | | RV | FH | Repetition number | | |

TABLE 13

| 1 bit | 1 bit | 1 bit | 1 bit | 1 bit | 1 bit | 1 bit | 1 bit | 1 bit | 1 bit | 1 bit | 1 bit | 1 bit | 1 bit |
|---|---|---|---|---|---|---|---|---|---|---|---|---|---|
| Mixed scheduling | Mixed scheduling of continuous processes supported by 10 bits | | | | | | | | | FH + RV + R = 3 | | | |
| 3 TBs & 4 TBs | 4 TBs | 3 bits indicate 4 processes | | | | | | | NDI | FH + RV + R = 4 | | | |
| | 3 TBs | 4 bits indicate 3 processes | | | | | | | NDI | FH + RV + R = 4 | | | |
| 1 TB & 2 TBs | | Full flexibility | | | | | | | RV | FH | Repetition number | | |

The scheduling of 3 TBs has a total of $C_8^3 = 56$ states, and the quantity of locations of 3 continuous TBs is 6. The scheduling of 4 TBs has a total of $C_8^4 = 70$ states, and the quantity of locations of 4 continuous TBs is 5. Neither 3 TBs nor 4 TBs have full flexibility in the above manners, and thus some process locations need to be selected for indication, including continuous locations.

Further specifically, the DCI size with 4 bits may be increased, as shown in Table 14.

TABLE 14

| | b0 | b1 | b2 | | b9 | 1 | |
|---|---|---|---|---|---|---|---|
| | | 10 bits indicate a continuous process | | | | FH + RV + R = 3 | |
| 1 TB & 2 TBs | | 7 bits indicate 1 TB & 2 TBs | | RV + FH + R = 4 | | | SRS domain/ CSI |
| other | | Others (bitmap or 3 TB scheduling or others) | | | | FH + RV + R = 3 | |

Further specifically, the DCI size with 6 bits or the DCI size with 5 bits may be increased, and meanwhile, the full flexibility may be indicted, as shown in Table 15.

TABLE 15

| Scheduling of 3 TB, 5 TB, 6 TB | | 12 bits indicate 448 states, 1792 states and 1792 states of 3 TBs, 5 TBs and 6 TBs, a total of 4032 states | | FH + RV + R = 3 | |
|---|---|---|---|---|---|
| Scheduling except the scheduling of 3 TB, 5 TB, 6 TB | 7 TBs & 4 TBs | 11 bits indicate 1024 states and 1120-128 states of 7 TBs and 4 TBs respectively, a total of 2016 states (states of 4 processes do not include 128 states of 0123, 1234, 2345, 3456, 4567, 5670, 6701 and 7012) | | | |
| | 8 TBs | | 8-bit NDI | FH + RV + R = 4 or | SRS |
| | 1 TB & 2 TBs | | 7-bit full flexibility solution | FH + RV + R + CSI = 4 | |
| | Part of 4 TBs | Select 8 locations | 4-bit NDI | | |

Alternatively, the above may be described as follows by adopting the joint indication solution.

In the scheduling of 1 TB and 2 TBs, the SRS information is included, and at this point, the RV, the FH and the R adopt 16 values.

In the scheduling of 8 TBs, the SRS information is included, and at this point, the RV, the FH and the R adopt 16 values or 8 values.

In the scheduling of 3 TBs, 5 TBs, 6 TBs and 7 TBs, the SRS information is not included, and the RV, the FH and the R adopt 8 values.

In the scheduling of part of 4 TBs, the SRS information is included, and at this point, the RV, the FH and the R adopt 8 values or 8 values. For the part where the SRS information is not included, the RV, the FH and the R adopt 8 values.

The quantity of processes, the process HARQ ID and the NDI information are coded jointly with the FH, the RV, R and the SRS. FH+RV+R=4 bits. The SRS request has 2 values, which is specifically described below.

In the scheduling of 3 TBs, FH+RV+R=3, 8 values are used, no SRS request is involved, and there are a total of $C_8^3 * 2^3 * 8 = 3584$ values.

In the scheduling of 5 TBs, FH+RV+R=3, 8 values are used, no SRS request is involved, and there are a total of $C_8^3 * 2^5 * 8 = 14336$ values.

In the scheduling of 6 TBs, FH+RV+R=3, 8 values are used, no SRS request is involved, and there are a total of $C_6^3 * 2^6 * 8 = 14336$ values.

In the scheduling of 7 TBs, FH+RV+R=3, 8 values are used, no SRS request is involved, and there are a total of $C_8^7 * 2^8 * 8 = 8192$ values.

In summary, M=40448 states.

In a case A, A1: when 2 TBs are scheduled, FH+RV+R=4, 16 values are used, the SRS has 2 values, and there are a total of $C_8^2 * 2^2 * 32 = 3584$ values; or A2: when 1 TB is scheduled, there are 2 RV indication values, the FH has 2 values, The R has 4 values, the SRS has 2 values, and there are a total of $C_8^2 * 2^2 * 64 = 7168$ values.

In a case B, B1: when 4 TBs are scheduled, FH+RV+R=3, 8 values are used, no SRS is involved, and there are a total of $C_8^4 * 2^4 * 8 = 8960$ values; or B2: when 4 TBs are scheduled, FH+RV+R=3, 8 values are used, no SRS request is involved, and there are a total of $(C_8^4-8) * 2^4 * 8 = 7936$ values; FH+RV+R=4, 16 values are used, the SRS has 2 values, and there are a total of $8 * 2^4 * 32 = 4096$ values, with a total of 1203 values; or B3: when 4 TBs are scheduled, FH+RV+R=3, 8 values are used, no SRS request is involved, and there are a total of $(C_8^4-5) * 2^4 * 8 = 8320$ values; FH+RV+R=4, 16 values are used, the SRS has 2 values, and there are a total of $5 * 2^4 * 32 = 2560$ values, with a total of 10880 values.

In a case C, C1: when 8 TBs are scheduled, FH+RV+R=3, 8 values are used, the SRS has 2 values, and there are a total of $2^8 * 16 = 2^{12} = 4096$ values; or C2: when 8 TBs are scheduled, FH+RV+R=4, 16 values are used, the SRS has 2 values, and there are a total of $2^8 * 32 = 2^{13} = 8192$ values.

In a case D, D1: when 1 TB is scheduled, FH+RV+R=4, 16 values are used, the SRS has 2 values, and there are a total of $C_8^1 * 2^2 * 4^2 * 2 = 2^9 = 512$ values; or D2: when 1 TB is scheduled, FH+RV+R=5, 32 values are used, the SRS has 2 values, and there are a total of $C_8^1 * 2 * 2^5 * 2 = 2^{10} = 1024$ values.

The sum of the quantity of values M+A+B+C+D may be less than or equal to $2^{16} = 65536$, as long as the following condition that A2, B2 and C2 or A2, B3 and C2 are not selected at the same time is satisfied.

The above is described using the case where FH+RV+R=4 adopt 16 values, and the case may be replaced by the case where FH+RV+R+CSI=4 adopt 16 values, which will not be repeated here for the sake of simplicity.

In an embodiment, for CE mode B, when a multi-TB scheduling function is configured, the design of DCI is increased by 4 bits (compressed by 1 bit) compared with the conventional DCI, and the scheduling flexibility is higher.

Specifically, 1 bit may be used for indicating mixed scheduling and non-mixed scheduling, the non-mixed scheduling adopts a bitmap manner, and the mixed scheduling state is mainly achieved by continuous process scheduling, as shown in Table 16.

TABLE 16

| b(0) | b(1) | b(2) | b(3) | b(4) | b(5) |
|---|---|---|---|---|---|
| 1 | | Mixed scheduling (different NDIs) with 5 bits | | | |
| 0 | | HARQ ID bitmap | | NDI (when the value of NDI is the same) | |

The indicating method of mixed scheduling with 5 bits may be shown in Table 17. 32 numbers correspond to 14+12+6=32 states. It is to be understood that the corresponding method is variable, and for example, the method in which numbering is started from a single process may also be adopted.

TABLE 17

| Scheduled HARQ process index (total) | HARQ process index | NDI | Hybrid scheduling state number | State indication with 5 bits |
|---|---|---|---|---|
| 4 HARQ processes (14) | 0123 | 0001, 0010, 0011, 0100, 0101, 0110, 0111, 1000, 1001, 1010, 1011, 1100, 1101, 1110 | 14 | 00000, 00001, 00010, 00011, 00100, 00101, 00110, 00111, 01000, 01001, 01010, 01011, 01100, 01101 |
| 3 HARQ processes (6 + 6 = 12) | 012 | 001, 010, 011, 100, 101, 110 | 6 | 01110, 01111, 10000, 10001, 10010, 10011 |
| | 123 | 001, 010, 011, 100, 101, 110 | 6 | 10100, 10101, 10110, 10111, 11000, 11001 |
| 2 HARQ processes (2 + 2 + 2 = 6) | 01 | 01, 10 | 2 | 11010, 11011 |
| | 12 | 01, 10 | 2 | 11100, 11101 |
| | 23 | 01, 10 | 2 | 11110, 11111 |

Specifically, 1 bit may be used for indicating whether 1 or 2 transport blocks are scheduled (scheduling of 1 TB and 2 TBs) or 3 or 4 transport blocks are scheduled (scheduling of 3 TBs and 4 TBs), as shown in Table 18 or Table 19.

TABLE 18

| 1 bit | 1 bit | 1 bit | 1 bit | 1 bit | 1 bit |
|---|---|---|---|---|---|
| 1 TB & 2 TBs | HARQ ID1 | | HARQ ID2 | | If ID1 = ID2, 1-bit NDI indicates a single process; if ID1 < ID2, the NDI of the first and second processes is 0; if ID1 > ID2, the NDI of the first and second processes is 1. |
| 3 TBs & 4 TBs | 1(4 TBs) 0(3 TBs) | N(0) 1 0 | N(1) N(0) N(1) | N(2) N(1) N(2) | N(3) N(2) N(3) |

TABLE 19

| a | b(0) | b(1) | b(2) | b(3) | b(4) |
|---|---|---|---|---|---|
| 1 TB & 2 TBs | Single process and process with indexes 01 or 23 | Single process Processes with indexes 01 and 23 | Selection of a single process Select processes with indexes 01 or 23 | NDI 2-bit NDI | |
| | Processes with indexes 02, 03, 13, 12 | Select processes with indexes 02, 03, 12 or 13 | | 2-bit NDI | |
| 3 TBs & 4 TBs | 1(4 TBs) 0(3 TBs) | N(0) 1 0 | N(1) N(0) N(1) | N(2) N(1) N(2) | N(3) N(2) N(3) |

With reference to Table 19, in the indication of 5 bits b(0) to b(4), a=0, which indicates the scheduling of 1 TB and 2 TBs:

when b(0)b(1)=00, b(2)b(3) indicates that process with an index 0, 1, 2 or 3 is scheduled, and b(4) is the NDI of a single process;

when b(0)b(1)=01, b(2) indicates that processes with indexes 01 or 23 are scheduled, and b(3)b(4) is the NDI of 2 processes;

when b(0)=1, b(1)b(2) indicates that processes with indexes 02, 03, 12 or 13 are scheduled, and b(3)b(4) is the NDI of 2 processes;

a=1, which indicates the scheduling of 3 TBs and 4 TBs:

when b(0)=1, b(1)b(2)b(3)b(4) indicates the NDI of 4 scheduled processes;

when b(0)b(1)=01, b(2)b(3)b(4) indicates the NDI of 3 scheduled processes 012;

when b(0)b(1)=00, b(2)b(3)b(4) indicates the NDI of 3 scheduled processes 123.

In the above indication, the scheduling of 4 TBs may be explained according to the above structures. For example, the location of the indicated process is not limited, and a=1 is not limited to indicate the scheduling of 3 TBs and 4 TBs and may also indicates the scheduling of 1 TB and 2 TBs.

In addition, the full flexibility solution of the indication of 1 TB and 2 TBs may be shown in Table 20 and Table 21.

TABLE 20

| a | b(0) | b(1) | b(2) | b(3) | b(4) |
|---|---|---|---|---|---|
| 1 & 2 TB | Singles process and processes with indexes 01 or 23 | Singles process | Selection of a single process | | NDI |
| | | Processes with indexes 01 and 23 | Select processes with indexes 01 or 23 | 2-bit NDI | |
| | Processes with indexes 02, 03, 13 or 12 | | Select processes with indexes 02, 03, 12 or 13 | 2-bit NDI | |

TABLE 21

| 1 bit | 1 bit | 1 bit | 1 bit | 1 bit | 1 bit |
|---|---|---|---|---|---|
| 1 TB & 2 TBs | HARQ ID1 | | HARQ ID2 | | If ID1 = ID2, 1-bit NDI indicates a single process; if ID1 < ID2, the NDI of the first and second processes is 0; if ID1 > ID2, the NDI of the first and second processes is 1. |

Further specifically, the joint indication of the MCS with the process ID, the quantity of TBs and the NDI information may be achieved using 10 bits.

80 states indicate the process ID, the quantity of TBs, and the NDI information, and the combined with 10, 11 or 12 states of the MCS to indicate a total of 800 (downlink) or 880 (uplink) or 960 states (uplink) or 880+1 states with 10 bits. Therefore, the common method for uplink and downlink is to directly use joint indication or the state based on joint indication and is described using the corresponding index values obtained from the formula.

For downlink transmission, there may be the following six cases.

1. 1 bit indicates mixed and non-mixed scheduling. For the non-mixed scheduling, the non-mixed scheduling is indicated using 5-bit MCS and 4-bit MCS.

For the mixed scheduling, the quantity of states of the mixed scheduling is 50, the quantity of states of the MCS is 40, and there are a total of 500 states. The mixed scheduling is indicated using a joint indication with a total of 9 bits.

2. 1 bit indicates the scheduling of 1 TB and 2 TBs or the scheduling of 3 TBs and 4 TBs.

When the indication is the scheduling of 1 TB and 2 TBs, there are a total of 32 states, the scheduling of 1 TB and 2 TBs is indicated with 5 bits, and at this point, the MCS and the scheduling of 1 TB to 2 TBs are indicated separately. When the indication is the scheduling of 3 TBs and 4 TBs, there are a total of 48 states, the scheduling of 3 TBs and 4 TBs and the MCS are jointly indicated, there are a total of 480 states at this point, and 9 bits are adopted for indication. The above scheduling is specifically shown in Table 22.

TABLE 22

| 1 bit | 1 bit | 1 bit | 1 bit | 1 bit | 1 bit | 1 bit | 1 bit | 1 bit | 1 bit |
|---|---|---|---|---|---|---|---|---|---|
| 1 和 2 | Single process + process indexes 01 or 23 | Single process | 2 bits indicates the single process | | NDI | | MCS | | |
| | | Process indexes 01 or 23 | 1 bit | 2-bit NDI | | | | | |
| | Process indexes 12, 02, 03, or process indexes 13+ | Select process indexes 12, 02, 03 or 13 | 2-bit NDI | | MCS | | | | |
| 3 和 4 | 4 processes and process indexes 012 | 5 bits indicate the indication of 4 processes or the process indexes 012, with M states of the MCS the NDI information of 3 processes when 4 processes are selected. | | | | | 3-bit NDI of processes 012 | | |
| | 3 processes with an indexes 023, 013 or 123 | 5 bits indicate the selection of 3 cases and M values of the MCS in each case. | | | | | NDI | | |

The merge of each cell represents the joint indication of the contained information. In the above cells, the quantity of M values is less than or equal to 10. It is to be noted that this method may also be used for uplink, and the structure of 1

TB and 2 TBs in the table is similar to that in the above method, so details will not be repeated here.

3. 1 bit indicates the scheduling of 1 TB, 2 TBs, and 4 TBs or the scheduling of 3 TBs and 4 TBs.

When the scheduling of 3 TBs is indicated, the quantity of scheduling states is 4*8=32, and the scheduling of 3 TBs is indicated with 5 bits and the MCS is indicated with 4 bits.

When the scheduling of 1 TB, 2 TBs, and 4 TBs is indicated, the quantity of scheduling states is 48, there are a total of 480 states of the joint indication with the MCS, and the scheduling is indicated with 9 bits.

4. 1 bit indicates the scheduling of an odd number of processes or the scheduling of an even number of processes.

When the scheduling of 1 TB and 3 TBs is indicated, there are a total of 40*10=400 states, and the scheduling may be achieved with 9 bits.

When the scheduling of 2 TBs and 4 TBs is indicated, there are a total of 40*10=400 states, and the scheduling may be achieved with 9 bits.

5. 1 bit indicates the scheduling of continuous processes or the scheduling of discontinuous processes.

When continuous processes are scheduled, there are a total of 44*10=440 states, and the scheduling may be achieved with 9 bits.

When discontinuous processes are scheduled, there are a total of 36*10=360 states, and the scheduling may be achieved with 9 bits.

6. 1 bit indicates the scheduling of 1 TB and 3 TBs or the scheduling of 2 TBs and 4 TBs, as shown in Table 23.

TABLE 23

| 1 bit | 1 bit | 1 bit | | |
|---|---|---|---|---|
| 1 TB & 3 TBs | Single process + processes with indexes 012 | Processes with indexes 012 | 3-bit NDI | MCS (8*10) |
| | | Single process | Process index     NDI | MCS (8*10) |
| | Processes with indexes 123 013 023 | | Joint coding (24*10) | |
| 2 TBs & 4 TBs | 2 TBs 4 TBs | | Joint coding (24*10) NDI | MCS |

For uplink transmission, there may be the following three cases.

1. 1 bit distinguishes odd-numbered processes and even-numbered processes.

When 1 TB and 3 TBs are scheduled, there are a total of 40*11=440 states, and the scheduling may be achieved with 9 bits.

When 2 TBs and 4 TBs are scheduled, there are a total of 40*11=440 states, and the scheduling may be achieved with 9 bits.

2. 1 bit indicates the scheduling of continuous processes or the scheduling of discontinuous processes.

When continuous processes are scheduled, there are a total of 44*11=484 states, and the scheduling may be achieved with 9 bits.

When discontinuous processes are scheduled, there are a total of 36*11=396 states, and the scheduling may be achieved with 9 bits.

The quantity of single processes is 8, 2 processes has a total of 3*4=12 states, and 3 processes has a total of 2*8=16 states.

3. One state of the MCS is removed (for example, the minimum MCS value or the maximum MCS value is removed) to make it consistent with that in the downlink solution.

Further specifically, the process ID, the quantity of TBs and the NDI may be indicated with 7 bits, and the MCS is compressed to 3 bit. At this point, the MCS in the uplink is reduced by 4 or 3 values, and the MCS in the downlink is reduced by 2 values.

Further specifically, in order to ensure the full flexibility of scheduling of 1 TB and 2 TBs, the MCS and the repetition number may be appropriately compressed when 3 TBs and 4 TBs are scheduled, as shown in Table 24 and Table 25.

TABLE 24

| 1 bit | 1 bit | 1 bit | 1 bit | 1 bit | 1 bit | 1 bit | 1 bit | 1 bit | 1 bit | 1 bit | 1 bit |
|---|---|---|---|---|---|---|---|---|---|---|---|
| 1 TB & 2 TBs | | 5 bits | | | | | MCS | | | Repetition number | |
| 3 TBs & 4 TBs | 4 TBs | NDI | | | | | MCS | | | Repetition number | |
| | 3 TBs | 2 bits select indexes of 3 processes | | 3-bit NDI | | | Repetition number + MCS are jointly indicated with 5 bits, and at this point the MCS has 8 values. | | | | |

TABLE 25

| 1 bit | 1 bit | 1 bit | 1 bit | 1 bit | 1 bit | 1 bit | 1 bit | 1 bit | 1 bit | 1 bit | 1 bit |
|---|---|---|---|---|---|---|---|---|---|---|---|
| 1 TB & 2 TBs | | 5 bits | | | | | MCS | | | Repetition number | |
| 3 TBs & 4 TBs | | MCS has M MCS value based on the repetition number (M ≤ 10). | | | | | | | | | |

Further specifically, in order to ensure the full flexibility of scheduling of 1 TB and 2 TBs, the MCS remains unchanged when 3 TBs and 4 TBs are scheduled so that the scheduling state of 3 TBs may be compressed.

When the scheduling of 1 to 2 TBs is indicated, there are a total of 32 states, the scheduling is indicated with 5 bits, and the MCS and the scheduling of 1 to 2 TBs are indicated separately.

When the scheduling of 3 to 4 TBs is indicated, there are a total of N states, the scheduling of 3 to 4 TBs and the MCS are jointly indicated, there are a total of 11*N≤512 states at this point, 9 bits are used for indication, and N≤46 at this point. The scheduling of 3 to 4 TBs has a maximum of 48 states, so only 2 states need to be removed.

For example, the two mixed scheduling states of 023 (or 013) in the scheduling of 3 TBs may be removed, because 023 (or 013) may be replaced by 013 (or 023), that is, the scheduling of 023 or 013 of 3 TBs is not supported.

As can be seen from Table 26, all 16 scheduling states of 4 TBs have been included, and number of the scheduling states of 3 TBs is less than or equal to 30. Single process+ processes with indexes 01, 23 in the cell represents that all single processes or 2 processes with indexes 01 or 23 may be scheduled.

In an embodiment, for CE mode B, when a multi-TB scheduling function is configured, the design of DCI is increased by 3 bits or 2 bits (compressed by 2 bits or compressed by 3 bits) compared with the conventional DCI, and certain scheduling flexibility may be ensured. When the MCS or other domains is compressed based on the repetition number, the sliding correspondence method is described as follows.

When the repetition number N (N is 4 when 2 bits are increased while N is 8 when 3 bits are increased) is set to have the quantity of set elements X and the offset value a, n satisfies that X+n*a≤N and indicates the quantity of sets, where the repetition number is divided into the sets and n is a natural number 0, 1, 2 or so on.

TABLE 26

| 1 bit | 1 bit | 1 bit | 1 bit | 1 bit | 1 bit | 1 bit | 1 bit | 1 bit | 1 bit |
|---|---|---|---|---|---|---|---|---|---|
| 1 TB and 2 TBs | Single process + processes with indexes 01, 23 | Single process Processes with indexes 01 or 23 | 2 bits indicates a single process 1 bit for selection | | NDI 2-bit NDI | | MCS | | |
| | Processes with indexes 12 02 03 13+ | Select processes with indexes 12, 02, 03 or 13 | 2-bit NDI | | | | MCS | | |
| 3 TBs and 4 TBs | 11 MCS values and N states of 3 TBs and 4 TBs are jointly indicated, and there are 11*N ≤ 512 states | | | | | | | | |

For other domains such as MCS, different numbers of sets may be obtained according to the quantity of set elements Y, the starting value a1 and the offset value a2 of the DCI repetition number, and when the repetition number and the quantity of sets in MCS are equal to those in the other domain, the quantity of the divided sets based on the repetition number and the quantity of sets are the same and may be in a one-to-one correspondence with each other. This method is called sliding correspondence method.

Specifically, there are three cases for the scenarios of increasing 3 bits.

1. The HARQ ID, the quantity of TBs and the NDI information are indicated by 6 bits, and the MCS is indicated by a total of 6 bits based on the repetition number or the MCS is indicated by 3 bits.

The MCS is indicated by a total of 6 bits based on the repetition number, including that the MCS sets are different or the same for different repetition numbers, and when a1=a2, the MCS sets are the same.

However, the joint indication of the MCS and the repetition number mainly follows the principle that the MCS should not be large under a large repetition number and should not be small under a small repetition number. FIG. 3 is a schematic diagram of a joint indication (downlink transmission) of the MCS and the repetition number according to an embodiment. As shown in FIG. 3, the repetition numbers from R0 to R7 increase in sequence, and the MCS values from M0 to M9 or M10 increase gradually. The above method may be described as follows.

In the set where repetition numbers increase in sequence, the first X repetition numbers and the last 8−X repetition numbers correspond to Y different sets of MCS values, the set with fewer repetition numbers is the first X repetition numbers and corresponds to Y=8 large continuous values of the MCS, and the set with more repetition numbers is the last 8−X repetition numbers and corresponds to Y=8 small continuous values of the MCS. a2 is the offset of the starting location corresponding to the large continuous MCS values relative to the first value M0 when there are a small number of repetition numbers, which is 2 in FIG. 3. a1 is the offset of the starting location corresponding to the small continuous MCS values relative to the first value M0 when there are a large number of repetition numbers, which is 0 in FIG. 3. a2≥a1. There are a total of 4*8+4*8=64 values, with a total of 6 bits for indication.

X may also be 3, 5 or other positive integer values, and Y may be 5, 6 or other positive integer values.

In addition, for uplink transmission, there are 11 values of the MCS, and 8 values may be selected from the 11 values. The method is similar to that of downlink transmission, and details will not be repeated here.

2. The HARQ ID, the quantity of TBs, the NDI information, the MCS and the repetition number are jointly indicated with a total of 12 bits.

The process ID, the quantity of processes, and the NDI information have a total of 80 states, the repetition number has 8 states, using 12 bits are adopted for indication, and then the MCS has at most 6 states. At this point, the original 10 MCS states indicated in the downlink (11 MCS states in the uplink) need to be compressed into 6 states, and the compression principle is similar to that in the above method. When there are a small number of repetition numbers, 6 large continuous MCS values are selected, and when there are a large number of repetition numbers, 6 small continuous MCS values are selected.

Alternatively, under the condition of guaranteeing 32 states of single process 2 TB scheduling and 16 states of 4 processes, the joint indication is performed. At this point, there are a total of 48 states, so the quantity of MCS states is 10. For downlink, the MCS may not be compressed and directly indicated by joint indication. For uplink, one MCS state needs to be removed, for example, the maximum MCS or the minimum MCS value is directly removed or 10 MCS values are obtained by the method described above.

Alternatively, there are 8 states for the scheduling of a single process, 12 states of 2 continuous processes (which have process indexes 01, 12 or 23) (6 states for mixed scheduling and 6 states for non-mixed scheduling), 16 states of 3 continuous processes (which have process indexes 012 or 123), and 16 states of 4 processes, a total of 52 states. Therefore, there are 9 MCS values, and then one MCS value (for downlink transmission) or two (for uplink transmission) MCS values may be directly removed or 9 MCS values may be obtained by the method described above.

3. The HARQ ID, the NDI, and the quantity of TBs are indicated with 5 bits, as shown in Table 27.

TABLE 27

| b(0) | b(1) | b(2) | b(3) | b(4) |
|---|---|---|---|---|
| 4 | | NDI | | |
| 1 & 2 | 1 process | Select a process with an index 0, 1, 2 or 3 | | NDI |
| | 2 processes | Select processes with indexes 01 or 23 | NDI | |

Specifically, there are three cases for the scenarios of increasing 2 bits.

1. The process indication is indicated by 6 bits, 3-bit indication is used for the MCS based on the repetition number is indicated by 3 bits, and the DCI repetition number based on the repetition number is indicated by 1 bit.

The rule of DCI repetition number based on the repetition number is that the DCI repetition number changes to {r1, r2}, {r2, r3}, {r3, r4} according to the set of repetition indications. Of course, when the repetition number in an indicated shared channel is large, the indicated repetition number in the set of the DCI repetition number should also correspond to a large value. When the repetition number in the indicated shared channel is small, the indicated repetition number in the set of the DCI repetition number should also correspond to a small value. FIG. 4 is a schematic diagram of the DCI repetition number based on the repetition number according to an embodiment. As shown in FIG. 4, repetition numbers from R0 to R7 increase in sequence. The method may be described as follows.

The repetition number is divided into three sets according to the granularity X, the DCI repetition number set to which the first X repetition numbers corresponds is {r1, r2}; the starting repetition number of the second X repetition numbers is Ra, and the second X repetition numbers correspond to {r2, r3}; and the starting repetition number of the third repetition number set is R (2a), and the third repetition number set corresponds to {r3, r4}. At this point, the DCI repetition number based on the repetition number is indicated by only 1 bit.

2. The process indication, the repetition number, the MCS and the DCI repetition number are jointly indicated, with a total of 13 bits.

Assuming that the process indication has m1 states and the MCS has m2 states, the DCI repetition number based on the repetition number is indicated by 1 bit. At this point, the solution with 13 bits is adopted, and m1*m2<512.

When M1=80, the MCS has 6 values.

When m1=60 to 64, the MCS has 8 values.

3. The process instruction is indicated by 5 bits, and the MCS is indicated by 3 bits. At this point, the process ID, the quantity of TBs and the NDI information are indicated by 5 bits, and the MCS is compressed into 3 bits.

In an embodiment, when a multi-TB scheduling function is configured, the present application also supports the design of bundling, gap, interleaving, early termination and preconfigured uplink resource (PUR) transmission.

1. Design of Bundling

In the multi-TB scheduling, if the radio resource control (RRC) configuration enables the feature of bundling, for CE mode A, the maximum size of bundling during the scheduling is 4 TBs. The quantity of TBs of bundling may be obtained mainly in the following manners.

1) 2 bits indicate the quantity of TBs of the bundling {1, 2, 3, 4}.

2) 1 bit indicates the default size of the bundling when the bundling is enabled.

3) The quantity of bundled TBs is $\lceil N/2 \rceil$ and $N-\lceil N/2 \rceil$ by default, where N is the quantity of processes currently scheduled.

4) The quantity of bundled TBs is $\lfloor N/2 \rfloor$ and $N-\lfloor N/2 \rfloor$ by default, where N is the quantity of processes currently scheduled.

5) When the number N of scheduled TBs is less than or equal to 4, the quantity of bundled TBs is N by default, and when the quantity of scheduled TBs is greater than 4, the quantity of bundled TBs is either $\lfloor N/2 \rfloor$ and $N-\lfloor N/2 \rfloor$ or $\lceil N/2 \rceil$ and $N-\lceil N/2 \rceil$.

6) When the number N of scheduled TBs is less than or equal to 4, the quantity of bundled TBs is N by default, and when the quantity of scheduled TBs is greater than 4, the quantity of bundled TBs is 4 and N−4.

7) When the bundling size is b, the quantity of the TBs currently scheduled is divided into $$g = \left\lceil \frac{N}{b} \right\rceil$$

groups, where the first g−1 groups are bundled with b transport blocks and the quantity of processes bundled with the last one group is g*b−N, and the value of b is determined according to a 1-bit bundling size signaling; when the signaling is a first predefined value, b is 2; and when the signaling is a second predefined value, b is 4 or that b=$\lceil N/2 \rceil$.

According to the existing design rules, the bundling is only supported when the repetition number in the physical downlink control channel (PDCCH) and the PDSCH is 1. The DCI repetition number domain multiplexing 2 bits is used for the quantity of TBs of the bundling.

For Manner 1), it is mainly used for non-interleaving scenarios. The non-interleaving scenario in Release 16 (R16) may reuse this design.

For Manner 2), it may be used in scenarios where the bundling needs to be supported when the repetition number is greater than 1. This 1 bit may be explained as when the indication is 0, the bundling size is 1, that is, the bundling is not actually performed; when the indication is 1, the bundling is enabled, and the bundle size is obtained by the method described in 3), 4), 5) and 6) above.

After the bundling is performed, the terminal device needs to feed back an acknowledgement/negative-acknowledgement (ACK/NACK) for multiple TBs of each bundling.

When the PDCCH schedules multiple TBs and the bundling is enabled, the quantity of ACKs/NACKs that the terminal device needs to feed back is 1 or 2. When only one ACK/NACK needs to be fed back, the ACK/NACK is fed back after the transmission of all scheduled TBs is finished. When two ACKs/NACKs need to be fed back, there are three relationships. FIG. 5 is a schematic diagram of the relationship between ACK/NACK and TB according to an embodiment.

In the non-interleaving scenario, each ACK/NACK is fed back according to the ACK/NACK feedback rule of non-bundling after the transmission of the last TB of the bundling is finished. In the interleaving scenario, two ACKs/NACKs may be fed back separately according to the manner described above, or may be fed back continuously after the transmission of scheduled TBs is finished.

2. Design of Gap

In a unicast non-interleaving scenario, when the gap is enabled, the gap insertion manner is determined according to the following formula:

$$NR\left\lceil \frac{\Theta}{R} \right\rceil,$$

where Θ is set as a gap trigger threshold, R is the repetition number of the scheduled PDSCH, and N is configured to be a positive integer, including 1, 2 and so on, and may be configured as a score such as ½, ¼ and so on; or $$\frac{N_{TB}}{N}R\left\lceil \frac{\Theta}{R} \right\rceil,$$

where $N_{TB}$ is the quantity of TBs when multiple TBs are scheduled by one PDCCH, and N is a positive integer, including 1, 2, 3, 4 and so on.

In a multicast scenario, the length of the inserted gap is A1*r*Rmax, where r is a repetition number indicated by DCI, Rmax is the maximum repetition number configured by a higher layer, A1 is a parameter configured by the higher layer and includes at least one of {0, 1} or may be other parameters such as 3/2, 5/4, 9/8 and other false scores. When A1 is 0, it means that there is no need to consider compatibility, and there is only the terminal device of version R16; When A1 is 1 or other positive integers, it means that the transmission compatibility with conventional terminal devices needs to be considered at this point, and the length of the inserted gap is A1*r*Rmax.

3. Design of Interleaving Granularity

When the RV changes in the same way as the traditional one, for CE mode A: when the frequency-hopping is enabled, the interleaving granularity is 4*Ych, and when the frequency-hopping is disabled, the interleaving granularity is 4; or when the frequency-hopping is configured, the interleaving granularity is 4*Ych, and when the frequency-hopping is not configured, the interleaving granularity is 4; and for CE mode B:

when the frequency-hopping is configured, the interleaving granularity is 16*Ych or 8*Ych, and when the frequency-hopping is not configured, the interleaving granularity is 16.

when the RV changes in such a way that each TB changes in its own RV manner, for CE mode A:

when the frequency-hopping is enabled, the interleaving granularity is N*Ych (N is the quantity of narrow bands), and when the frequency-hopping is disabled, the interleaving granularity is 1; or when the frequency-hopping is configured, the interleaving granularity is N*Ych, and when the frequency-hopping is not configured, the interleaving granularity is 1; and for CE mode B:

when the frequency-hopping is configured, the interleaving granularity is 4*Ych or 2*Ych, and when the frequency-hopping is not configured, the interleaving granularity is 4.

4. Design of Early Termination

For the early termination design manner in CE mode A/B, besides the original manners where the resource allocation domain or the MCS domain indicates the triggering of early termination, the manner of triggering early termination further includes one of the following manners.

1) The early termination is triggered by using a remaining state of a joint indication domain of the HARQ ID, the quantity of TBs, and the NDI information.

2) The HARQ ID or a remaining state of the quantity of TBs is indicated to trigger the early termination.

3) The early termination is triggered by using a remaining state of a joint indication domain of the HARQ ID, the quantity of TBs, the NDI information, and the MCS information.

After the early termination is triggered, the specific indication information method includes the following.

For CE mode A, when the resource allocation domain indicates the triggering of the early termination, other domain in the DCI except for the fields 'Flag for format 6-0A/6-1A differentiation' and 'DCI subframe repetition number' may be used for indicating early termination information. For CE mode B, the early termination is triggered by a specific value of the MCS conventionally, and other domains in the DCI format 6-0B except for the fields of 'Flag for format 6-0B/6-1B differentiation' and 'DCI subframe repetition number' are fixed values by default and may also be used for indicating early termination information.

The manner of indicating early termination includes one of the following manners.

All transport blocks are terminated.

An HARQ process that needs to be terminated is indicated by using n states or $\log_2(n)$ bits.

A single or multiple HARQ processes that need to be terminated are indicated by using $2^n-1$ states or a manner of an n-bit bitmap.

The termination of a current HARQ process or all currently transmitted HARQ processes is indicated by using 2 states or 1 bit.

When the early termination is triggered, a terminated HARQ process is indicated by using a high bit of a resource allocation domain.

In the above manners, n is the maximum number of scheduled HARQ processes.

The above solution is preferably used for interleaving scenarios.

For example, for CE mode B, the early termination may be described in Table 28.

TABLE 28

| b(0) | b(1) | b(2) | b(3) | b(4) | b(5) |
|------|------|------|------|------|------|
| 1 | | Mixed scheduling (different NDIs) with 5 bits | | | |
| 0 | | HARQ ID bitmap (0000 used for early termination) | | | NDI (when the value of NDI is the same) |

When all the current five bits are set to 0 or all the six bits are set to 0, the early termination is triggered, and at this point, the triggering method adopted is that the early termination is triggered by using a remaining state of a joint indication domain of the HARQ ID, the quantity of TBs, and the NDI information. The higher 4 bits of the 4-bit resource allocation domain are used for indicating the terminated process, and the method adopted is that the single or multiple processes that need to be terminated are indicated by using a 4-bit bitmap manner.

5. Design of PUR Transmission

When the DCI is used for PUR scheduling, the NDI signaling domain in the UL grant is used for representing PUSCH ACK DCI or a UL grant retransmitted by the PUSCH; the NDI signaling domain in the DL grant is used for representing PUSCH NACK DCI or a DL grant scheduled by the PDSCH; the NDI signaling domain in the DL grant is used for representing PUR fallback DCI, where the PUR fallback DCI represents that the base station does not receive the PUSCH correctly, and is used for triggering the UE to execute the fallback operation or the DL grant scheduled by the PDSCH, where the fallback operation refers to the behavior that the UE initiates the physical random access channel (PRACH).

Figure 6:
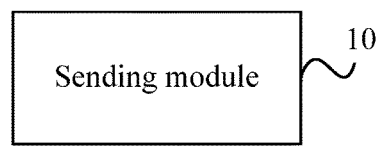
FIG. 6 is a structural schematic diagram of a control information indicating apparatus according to an embodiment.

FIG. 6 is a structural schematic diagram of a control information indicating apparatus according to an embodiment. The information indicating apparatus may be configured in a first communication node. As shown in FIG. 6, the control information indicating apparatus includes a sending module 10.

The sending module 10 is configured to send control information to a second communication node, where the control information is used for indicating the scheduling of one or more transport blocks, each transport block corresponds to one HARQ process when being scheduled, and each HARQ process has a corresponding HARQ process index and NDI information.

The control information indicating apparatus provided in this embodiment is configured to implement the control information indicating method described in the above-mentioned embodiments. The implementation principle and effects of the control information indicating apparatus provided in this embodiment are similar to those of the control information indicating method, and details will not be repeated here.

In an embodiment, the control information includes first indication information, and the control information further includes at least one of second indication information, third indication information, fourth indication information or eighth indication information.

The first indication information is used for indicating the quantity of transport blocks, an HARQ process index corresponding to each transport block, and NDI information corresponding to each transport block.

The second indication information includes an RV, an FH, and an R.

The third indication information includes sounding reference symbol (SRS) request information, where the SRS request information may also called sounding reference signal (SRS) request information.

The fourth indication information is used for indicating an indicating method; where the indicating method includes a first indicating method and a second indicating method, the first indicating methods indicates that one transport block is scheduled or two transport blocks are scheduled, and the second indicating method indicates that three transport blocks are scheduled or indicates scheduling indicated by an 8-process bitmap. Optionally, the fourth indication information may occupy 1 bit. When the bit is 0, the fourth indication information indicates the first indicating method; when the bit is 1, the fourth indication information indicates the second indicating method. Alternatively, when the bit is 1, the fourth indication information indicates the first indicating method; when the bit is 0, the fourth indication information indicates the second indicating method.

The eighth indication information includes an RV, an FH, an R, and CSI request information.

In an embodiment, the control information includes fifth indication information.

The fifth indication information includes the quantity of HARQ processes, an HARQ process index corresponding to each HARQ process, NDI information corresponding to each HARQ process, and MCS information.

In an embodiment, in a case where the fourth indication information indicates the first indicating method, the first indication information is 7 bits, the second indication information is 4 bits, and the third indication information is 1 bit.

In an embodiment, only in a case where the control information includes the fourth indication information and the fourth indication information indicates the first indicating method, the control information includes the third indication information.

In an embodiment, in a case where the second indication information is 4 bits, the repetition number includes R0, R1, R2, and R3, and R0<R1<R2<R33.

In a case where the repetition number is 1 or R0, the RV has 4 values, and the FH indicates that the frequency-hopping is disabled by default and has 1 value.

In a case where the repetition number is 2 or R1, the RV has 2 or 4 values, and the FH has 2 values.

In a case where the repetition number is greater than 2 or R2 or R3, the RV is fixed at 1 value, and the FH has 2 values.

In a case where the quantity of scheduled transport blocks is 1, the RV is 2 bits; and in a case where the quantity of scheduled transport blocks is 2, each transport block corresponds to a 1-bit RV.

In an embodiment, the control information includes sixth indication information, where the sixth indication information is 6 bits and is described by b(0)b(1)b(2)b(3)b(4)b(5), and the sixth indication information includes at least one of the following characteristics.

b(0) is used for indicating whether one or two HARQ processes are scheduled or three or four HARQ processes are scheduled.

In a case where b(0) is used for indicating that one or two HARQ processes are scheduled, b(1) is used for indicating whether one HARQ process with an index 0, 1, 2 or 3 or two HARQ processes with indexes 01 or 23 are scheduled or two HARQ processes with indexes 02, 03, 12 or 13 are scheduled.

In a case where b(1) is used for indicating whether one HARQ process with an index 0, 1, 2 or 3 or two HARQ processes with indexes 01 or 23 are scheduled, b(2) is used for indicating whether a single process is scheduled or two processes are scheduled; in a case where b(2) indicates that a single process is scheduled, b(3)b(4) indicates a process index 0, 1, 2 or 3 corresponding to the scheduled HARQ process, and b(5) indicates NDI information corresponding to the scheduled HARQ process; and in a case where b(2) indicates that two processes are scheduled, b(3) indicates process indexes 01 or 23 corresponding to the scheduled HARQ processes, and b(4)b(5) indicates NDI information corresponding to the scheduled HARQ processes.

In a case where b(1) is used for indicating that two HARQ processes with indexes 02, 03, 12 or 13 are scheduled, b(2)b(3) indicates process indexes 02, 03, 12 or 13 corresponding to the scheduled HARQ processes, and b(4)b(5) indicates NDI information corresponding to the scheduled HARQ processes.

In a case where b(0) is used for indicating that three or four HARQ processes are scheduled, b(1) is used for indicating whether three HARQ processes are scheduled or four HARQ processes are scheduled; in a case where b(1) indicates that four HARQ processes are scheduled, remaining four bits are used for indicating NDI information of the four processes; and in a case where b(1) indicates that three HARQ processes are scheduled, b(2) indicates whether a process index corresponding to the scheduled HARQ processes is 012 or 123, and b(3)b(4)b(5) indicates NDI information corresponding to the scheduled HARQ processes.

In an embodiment, the fifth indication information is 10 bits, and the quantity of states of the 10-bit indication is X or X+1, where X belongs to any one of {800, 880, 960}.

In an embodiment, in a case where three or four transport blocks are scheduled, the fifth indication information is 9 bits; or in a case where one or two transport blocks are scheduled, the fifth indication information is 9 bits, where the MCS information is 3 bits in the 9 bits; or in a case where three or four transport blocks are scheduled, the fifth indication information is 9 bits with a joint indication.

The joint indication (joint coding) refers to the joint coding of multiple domains that are originally coded separately, and the value of each code may correspond to the scheduling state of one specific related domain.

In an embodiment, the value of the MCS information is reduced by M, where M belongs to any one of {0, 1, 2}; or in a case where three transport blocks are scheduled, the scheduling of all processes except HARQ processes 013 is supported (that is, the scheduling of HARQ processes 013 is not supported when three transport blocks are scheduled); or in a case where three transport blocks are scheduled, the scheduling of all processes except HARQ processes 023 is supported (that is, the scheduling of HARQ processes 023 is not supported when three transport blocks are scheduled).

In an embodiment, the eighth indication information is 4 bits.

In an embodiment, in a case where bundling is enabled, a method of determining a bundling size of the quantity of bundled transport blocks includes one of the following manners.

The quantity of bundled transport blocks is determined to be $\lceil N/2 \rceil$ and $N-\lceil N/2 \rceil$ by default, where N is the quantity of transport blocks currently scheduled.

The quantity of bundled transport blocks is determined to be $\lfloor N/2 \rfloor$ and $N-\lfloor N/2 \rfloor$ by default, where N is the quantity of transport blocks currently scheduled.

In a case where the number N of scheduled transport blocks is less than or equal to 4, the quantity of bundled transport blocks is determined to be N by default, and in a case where the quantity of scheduled transport blocks is greater than 4, the quantity of bundled transport blocks is determined to be either $\lfloor N/2 \rfloor$ and $N-\lfloor N/2 \rfloor$ or $\lceil N/2 \rceil$ and $N-\lceil N/2 \rceil$.

In a case where the number N of scheduled transport blocks is less than or equal to 4, the quantity of bundled transport blocks is determined to be N by default, and in a case where the quantity of scheduled transport blocks is greater than 4, the quantity of bundled transport blocks is determined to be N and N−4.

In a case where the bundling size is b, the quantity of the transport blocks currently scheduled is divided into $$g = \left\lceil \frac{N}{b} \right\rceil$$

groups, where the first g−1 groups are bundled with b transport blocks and the quantity of processes bundled with the last one group is g*b−N, and the value of b is determined according to a 1-bit bundling size signaling; in a case where the signaling is a first predefined value, b is determined to be 2; and in a case where the signaling is a second predefined value, b is determined to be 4 or that b=⌈N/2⌉.

In an embodiment, in a case where an early termination is triggered, a method of triggering the early termination includes one of the following manners.

The early termination is triggered by using a remaining state of a joint indication domain of an HARQ ID, the quantity of transport blocks and the NDI information.

The HARQ ID or a remaining state of the quantity of transport blocks is indicated to trigger the early termination.

The early termination is triggered by using a remaining state of a joint indication domain of the HARQ ID, the quantity of transport blocks, the NDI information and the MCS information.

In an embodiment, in a case where an early termination is triggered, an early termination method includes one of the following manners.

All transport blocks are terminated.

An HARQ process that needs to be terminated is indicated by using n states or log$_2$(n) bits.

A single or multiple HARQ processes that need to be terminated are indicated by using 2^n−1 states or a manner of an n-bit bitmap.

The termination of a current HARQ process or all currently transmitted HARQ processes is indicated by using 2 states or 1 bit.

When the early termination is triggered, a terminated HARQ process is indicated by using a high bit of a resource allocation domain.

In the above manners, n is the maximum number of scheduled HARQ processes.

In an embodiment, the control information includes an aperiodic CSI trigger information domain.

In a case where the quantity of scheduled transport blocks is greater than 2, the aperiodic CSI trigger information domain is used for indicating process index related information; or in a case where the quantity of scheduled transport blocks is less than or equal to 2, the aperiodic CSI trigger information domain is 1 bit or has 2 values; or in a case where the quantity of scheduled transport blocks is greater than 1, the aperiodic CSI trigger information domain is used for indicating the process index related information; or in a case where the quantity of scheduled transport blocks is equal to 1, the aperiodic CSI trigger information domain is 1 bit or has 2 values; or only in a case where the repetition number is equal to 1, the aperiodic CSI trigger information domain is 1 bit or has 2 values.

In an embodiment, the control information includes seventh indication information.

The seventh indication information includes the quantity of HARQ processes, an HARQ process index corresponding to each HARQ process, NDI information corresponding to each HARQ process, an RV, an FH, an R, and SRS request information.

In an embodiment, in a case where the seventh indication information indicates that one or two transport blocks are scheduled, the RV, the FH, and the R have 16 values or 32 values.

In a case where the seventh indication information indicates that one or two transport blocks are scheduled, the control information includes the SRS request information.

In a case where the seventh indication information indicates that three, four, five, six, seven or eight transport blocks are scheduled, the RV, the FH, and the R have 16 values or 8 values.

In a case where the seventh indication information indicates that predefined four or predefined eight processes are scheduled, the RV, the FH, and the R have 16 values, and the SRS request information has 2 values, where the predefined P processes include at least P processes with successive process indexes, and P is 4 or 8.

The seventh indication information is 16 bits.

In an embodiment, the quantity of HARQ processes, the HARQ process index, and the NDI information are indicated by using a joint indication method, and an indication state is any possible combination. The any possible combination refers to any possibly scheduled combination.

Figure 7:
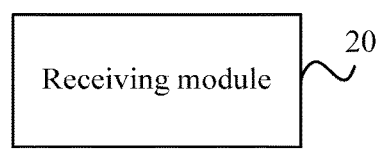
FIG. 7 is a structural schematic diagram of another control information indicating apparatus according to an embodiment.

FIG. 7 is a structural schematic diagram of another control information indicating apparatus according to an embodiment. The information indicating apparatus may be configured in a second communication node. As shown in FIG. 7, the control information indicating apparatus includes a receiving module 20.

The sending module 20 is configured to receive control information from a first communication node, where the control information is used for indicating the scheduling of one or more transport blocks, each transport block corresponds to one HARQ process when being scheduled, and each HARQ process has a corresponding HARQ process index and NDI information.

The control information indicating apparatus provided in this embodiment is configured to implement the control information indicating method described in the above-mentioned embodiments. The implementation principle and effects of the control information indicating apparatus provided in this embodiment are similar to those of the control information indicating method, and details will not be repeated here.

In an embodiment, the control information includes first indication information, and the control information further includes at least one of second indication information, third indication information, fourth indication information or eighth indication information.

The first indication information is used for indicating the quantity of transport blocks, an HARQ process index corresponding to each transport block, and NDI information corresponding to each transport block.

The second indication information includes an RV, an FH, and an R.

The third indication information includes sounding reference symbol (SRS) request information, where the SRS request information may also called sounding reference signal (SRS) request information.

The fourth indication information is used for indicating an indicating method; where the indicating method includes a first indicating method and a second indicating method, the first indicating methods indicates that one transport block is scheduled or two transport blocks are scheduled, and the second indicating method indicates that three transport blocks are scheduled or indicates scheduling indicated by an 8-process bitmap. Optionally, the fourth indication information may occupy 1 bit. When the bit is 0, the fourth indication information indicates the first indicating method; when the bit is 1, the fourth indication information indicates the second indicating method. Alternatively, when the bit is 1, the fourth indication information indicates the first indicating method; when the bit is 0, the fourth indication information indicates the second indicating method.

The eighth indication information includes an RV, an FH, an R, and CSI request information.

In an embodiment, the control information includes fifth indication information.

The fifth indication information includes the quantity of HARQ processes, an HARQ process index corresponding to each HARQ process, NDI information corresponding to each HARQ process, and MCS information.

In an embodiment, in a case where the fourth indication information indicates the first indicating method, the first indication information is 7 bits, the second indication information is 4 bits, and the third indication information is 1 bit.

In an embodiment, only in a case where the control information includes the fourth indication information and the fourth indication information indicates the first indicating method, the control information includes the third indication information.

In an embodiment, in a case where the second indication information is 4 bits, the repetition number includes R0, R1, R2, and R3, and R0<R1<R2<R33.

In a case where the repetition number is 1 or R0, the RV has 4 values, and the FH indicates that the frequency-hopping is disabled by default and has 1 value.

In a case where the repetition number is 2 or R1, the RV has 2 or 4 values, and the FH has 2 values.

In a case where the repetition number is greater than 2 or R2 or R3, the RV is fixed at 1 value, and the FH has 2 values.

In a case where the quantity of scheduled transport blocks is 1, the RV is 2 bits; and in a case where the quantity of scheduled transport blocks is 2, each transport block corresponds to a 1-bit RV.

In an embodiment, the control information includes sixth indication information, where the sixth indication information is 6 bits and is described by b(0)b(1)b(2)b(3)b(4)b(5), and the sixth indication information includes at least one of the following characteristics.

b(0) is used for indicating whether one or two HARQ processes are scheduled or three or four HARQ processes are scheduled.

In a case where b(0) is used for indicating that one or two HARQ processes are scheduled, b(1) is used for indicating whether one HARQ process with an index 0, 1, 2 or 3 or two HARQ processes with indexes 01 or 23 are scheduled or two HARQ processes with indexes 02, 03, 12 or 13 are scheduled.

In a case where b(1) is used for indicating whether one HARQ process with an index 0, 1, 2 or 3 or two HARQ processes with indexes 01 or 23 are scheduled, b(2) is used for indicating whether a single process is scheduled or two processes are scheduled; in a case where b(2) indicates that a single process is scheduled, b(3)b(4) indicates a process index 0, 1, 2 or 3 corresponding to the scheduled HARQ process, and b(5) indicates NDI information corresponding to the scheduled HARQ process; and in a case where b(2) indicates that two processes are scheduled, b(3) indicates process indexes 01 or 23 corresponding to the scheduled HARQ processes, and b(4)b(5) indicates NDI information corresponding to the scheduled HARQ processes.

In a case where b(1) is used for indicating that two HARQ processes with indexes 02, 03, 12 or 13 are scheduled, b(2)b(3) indicates process indexes 02, 03, 12 or 13 corresponding to the scheduled HARQ processes, and b(4)b(5) indicates NDI information corresponding to the scheduled HARQ processes.

In a case where b(0) is used for indicating that three or four HARQ processes are scheduled, b(1) is used for indicating whether three HARQ processes are scheduled or four HARQ processes are scheduled; in a case where b(1) indicates that four HARQ processes are scheduled, remaining four bits are used for indicating NDI information of the four processes; and in a case where b(1) indicates that three HARQ processes are scheduled, b(2) indicates whether process indexes corresponding to the scheduled HARQ processes are 012 or 123, and b(3)b(4)b(5) indicates NDI information corresponding to the scheduled HARQ processes.

In an embodiment, the fifth indication information is 10 bits, and the quantity of states of the 10-bit indication is X or X+1, where X belongs to any one of {800, 880, 960}.

In an embodiment, in a case where three or four transport blocks are scheduled, the fifth indication information is 9 bits; or in a case where one or two transport blocks are scheduled, the fifth indication information is 9 bits, where the MCS information is 3 bits in the 9 bits; or in a case where three or four transport blocks are scheduled, the fifth indication information is 9 bits with a joint indication.

The joint indication (joint coding) refers to the joint coding of multiple domains that are originally coded separately, and the value of each code may correspond to the scheduling state of one specific related domain.

In an embodiment, the value of the MCS information is reduced by M, where M belongs to any one of {0, 1, 2}; or in a case where three transport blocks are scheduled, the scheduling of all processes except HARQ processes 013 is supported (that is, the scheduling of HARQ processes 013 is not supported when three transport blocks are scheduled); or in a case where three transport blocks are scheduled, the scheduling of all processes except HARQ processes 023 is supported (that is, the scheduling of HARQ processes 023 is not supported when three transport blocks are scheduled).

In an embodiment, the eighth indication information is 4 bits.

In an embodiment, in a case where bundling is enabled, a method of determining a bundling size of the quantity of bundled transport blocks includes one of the following manners.

The quantity of bundled transport blocks is determined to be $\lceil N/2 \rceil$ and $N-\lceil N/2 \rceil$ by default, where N is the quantity of transport blocks currently scheduled.

The quantity of bundled transport blocks is determined to be $\lfloor N/2 \rfloor$ and $N-\lfloor N/2 \rfloor$ by default, where N is the quantity of transport blocks currently scheduled.

In a case where the number N of scheduled transport blocks is less than or equal to 4, the quantity of bundled transport blocks is determined to be N by default, and in a case where the quantity of scheduled transport blocks is greater than 4, the quantity of bundled transport blocks is determined to be $\lfloor N/2 \rfloor$ and $N-\lfloor N/2 \rfloor$ or $\lceil N/2 \rceil$ and $N-\lceil N/2 \rceil$.

In a case where the number N of scheduled transport blocks is less than or equal to 4, the quantity of bundled transport blocks is determined to be N by default, and in a case where the quantity of scheduled transport blocks is greater than 4, the quantity of bundled transport blocks is determined to be N and N−4.

In a case where the bundling size is b, the quantity of the transport blocks currently scheduled is divided into $$g = \left\lceil \frac{N}{b} \right\rceil$$

groups, where the first g−1 groups are bundled with b transport blocks and the quantity of processes bundled with the last one group is g*b−N, and the value of b is determined according to a 1-bit bundling size signaling; in a case where the signaling is a first predefined value, b is determined to be 2; and in a case where the signaling is a second predefined value, b is determined to be 4 or that b=$\lceil N/2 \rceil$.

In an embodiment, in a case where an early termination is triggered, a method of triggering the early termination includes one of the following manners.

The early termination is triggered by using a remaining state of a joint indication domain of an HARQ ID, the quantity of transport blocks and the NDI information.

The HARQ ID or a remaining state of the quantity of transport blocks is indicated to trigger the early termination.

The early termination is triggered by using a remaining state of a joint indication domain of the HARQ ID, the quantity of transport blocks, the NDI information and the MCS information.

In an embodiment, in a case where an early termination is triggered, an early termination method includes one of the following manners.

All transport blocks are terminated.

An HARQ process that needs to be terminated is indicated by using n states or $\log_2(n)$ bits.

A single or multiple HARQ processes that need to be terminated are indicated by using 2^n−1 states or a manner of an n-bit bitmap.

The termination of a current HARQ process or all currently transmitted HARQ processes is indicated by using 2 states or 1 bit.

When the early termination is triggered, a terminated HARQ process is indicated by using a high bit of a resource allocation domain.

In the above manners, n is the maximum number of scheduled HARQ processes.

In an embodiment, the control information includes an aperiodic CSI trigger information domain.

In a case where the quantity of scheduled transport blocks is greater than 2, the aperiodic CSI trigger information domain is used for indicating process index related information; or in a case where the quantity of scheduled transport blocks is less than or equal to 2, the aperiodic CSI trigger information domain is 1 bit or has 2 values; or in a case where the quantity of scheduled transport blocks is greater than 1, the aperiodic CSI trigger information domain is used for indicating the process index related information; or in a case where the quantity of scheduled transport blocks is equal to 1, the aperiodic CSI trigger information domain is 1 bit or has 2 values; or only in a case where the repetition number is equal to 1, the aperiodic CSI trigger information domain is 1 bit or has 2 values.

In an embodiment, the control information includes seventh indication information.

The seventh indication information includes the quantity of HARQ processes, an HARQ process index corresponding to each HARQ process, NDI information corresponding to each HARQ process, an RV, an FH, an R, and SRS request information.

In an embodiment, in a case where the seventh indication information indicates that one or two transport blocks are scheduled, the RV, the FH, and the R have 16 values or 32 values.

In a case where the seventh indication information indicates that one or two transport blocks are scheduled, the control information includes the SRS request information.

In a case where the seventh indication information indicates that three, four, five, six, seven or eight transport blocks are scheduled, the RV, the FH, and the R have 16 values or 8 values.

In a case where the seventh indication information indicates that predefined four or predefined eight processes are scheduled, the RV, the FH, and the R have 16 values, and the SRS request information has 2 values, where the predefined P processes include at least P processes with successive process indexes, and P is 4 or 8.

The seventh indication information is 16 bits.

In an embodiment, the quantity of HARQ processes, the HARQ process index, and the NDI information are indicated by using a joint indication method, and an indication state is any possible combination. The any possible combination refers to any possibly scheduled combination.

An embodiment of the present application further provides a communication node. The communication node includes a processor, which is configured to, when executing a computer program, perform the method provided by any one of the embodiments of the present application. Specifically, the communication node may be the first communication node provided by any one of the embodiments of the present application or may be the second communication node provided by any one of the embodiments of the present application, which is not specifically limited in the present application.

For example, the embodiments described below provide the structural schematic diagram in which the communication node is a UE and a base station respectively.

Figure 8:
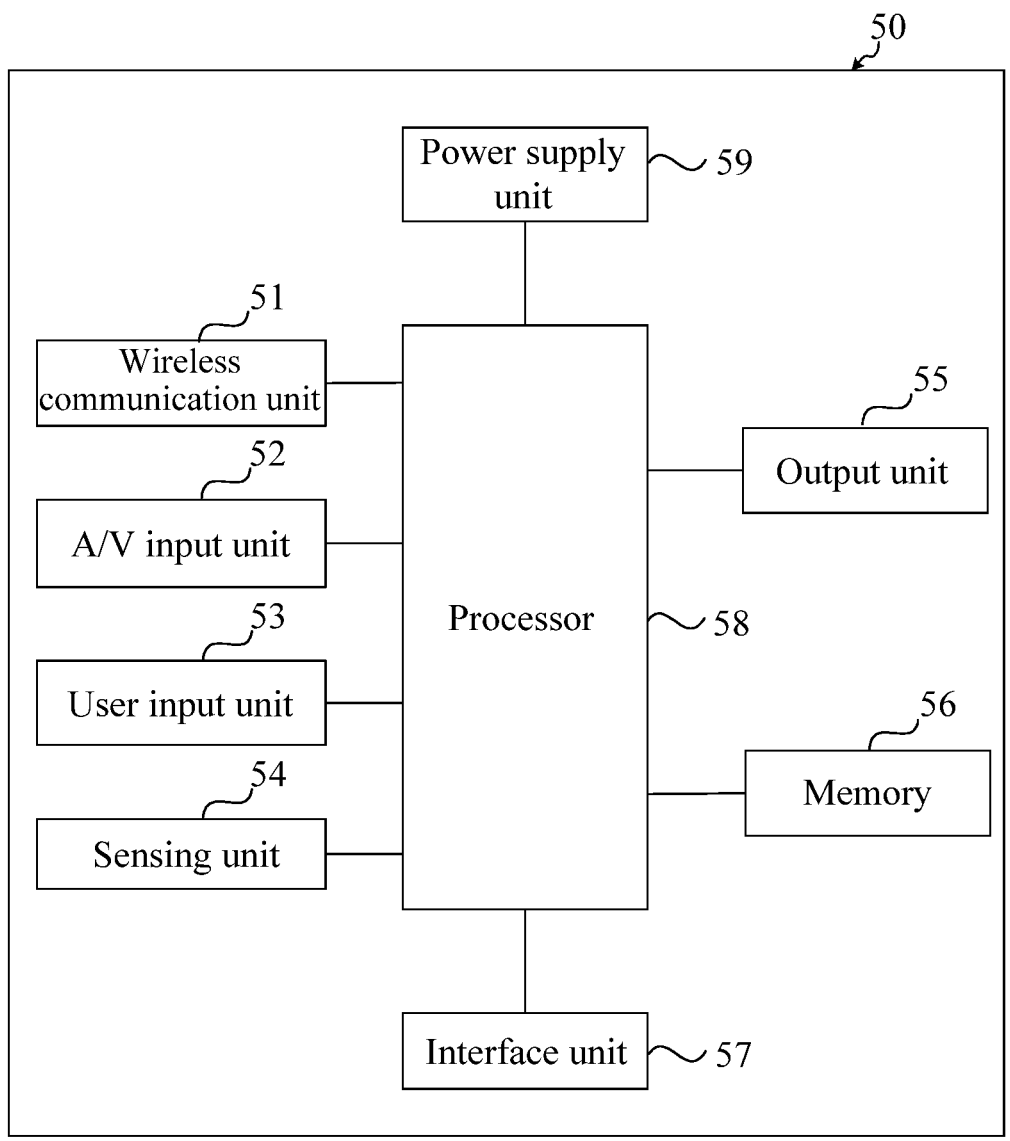
FIG. 8 is a structural schematic diagram of a UE according to an embodiment.

FIG. 8 is a structural schematic diagram of a UE according to an embodiment. The UE may be implemented in multiple forms. The UE in the present application includes, but is not limited to, a mobile terminal device such as a mobile phone, a smart phone, a notebook computer, a digital broadcast receiver, a personal digital assistant (PDA), a portable device (PAD), a portable media player (PMP), a navigation apparatus, a vehicle-mounted terminal device, a vehicle-mounted display terminal and a vehicle-mounted electronic rearview mirror and a fixed terminal device such as a digital television (TV) and a desktop computer.

As shown in FIG. 8, the UE 50 may include a wireless communication unit 51, an audio/video (A/V) input unit 52, a user input unit 53, a sensing unit 54, an output unit 55, a memory 56, an interface unit 57, a processor 58, and a power supply unit 59. FIG. 8 illustrates the UE including multiple assemblies, but it is to be understood that it is not required to implement all the illustrated assemblies. More or fewer assemblies may be implemented instead.

In this embodiment, the wireless communication unit 51 allows the wireless communication between the UE 50 and a base station or a network. The A/V input unit 52 is configured to receive audio or video signals. The user input unit 53 may generate key input data according to commands inputted by the user to control various operations of the UE 50. The sensing unit 54 is configured to detect, for example, the current state of the UE 50, the location of the UE 50, the presence or absence of the user's touch input to the UE 50, the orientation of the UE 50, and the acceleration movement and direction or deceleration movement and direction of the UE 50, and generate commands or signals for controlling the operation of the UE 50. The interface unit 57 serves as an interface through which at least one external apparatus may be connected to the UE 50. The output unit 55 is configured to provide output signals in a visual, audio, and/or tactile manner. The memory 56 may store, for example, a software program for processing and controlling operations executed by the processor 58 or may temporarily store data that has been outputted or is to be outputted. The memory 56 may include at least one type of storage medium.

Moreover, the UE 50 may cooperate with a network storage apparatus that performs the storage function of the memory 56 through a network connection. The processor 58 is generally configured to control the overall operation of the UE 50. The power supply unit 59 is configured to receive external or internal power under the control of the processor 58 and provide appropriate amount of power required for operating various elements and assemblies.

The processor 58 is configured to run the programs stored in the memory 56 to execute at least one function application and data processing, for example, to perform the transmission method provided by the embodiments of the present application.

Figure 9:
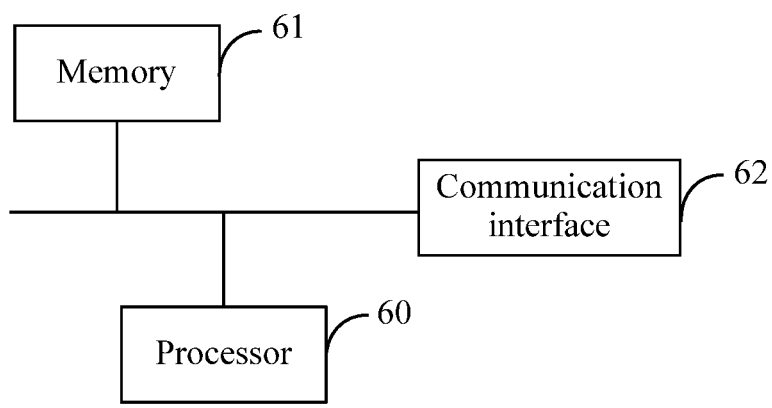
FIG. 9 is a structural schematic diagram of a base station according to an embodiment.

FIG. 9 is a structural diagram of a base station according to an embodiment. As shown in FIG. 9, the base station includes a processor 60, a memory 61, and a communication interface 62. The quantity of processors 60 in the base station may be one or more, and one processor 60 is illustrated as an example in FIG. 9. The processor 60, the memory 61, and the communication interface 62 in the base station may be connected through a bus or in other manners, and the connection through the bus is illustrated as an example in FIG. 9. The bus represents one or more of several types of bus structures, including a memory bus or a memory controller, a peripheral bus, an accelerated graphics port, a processor or a local bus using any bus structure among multiple bus structures.

As a computer-readable storage medium, the memory 61 may be configured to store software programs, computer executable programs and modules, such as program instructions/modules corresponding to the method in the embodiments of the present application. The processor 60 runs the software programs, instructions and modules stored in the memory 61 to execute at least one of function applications and data processing of the base station, that is, to implement the control information indicating method described above.

The memory 61 may include a program storage region and a data storage region. The program storage region may store an operating system and an application program required by at least one function, and the data storage region may store data created depending on use of a terminal.

In addition, the memory 61 may include a high-speed random-access memory, and may also include a non-volatile memory such as at least one disk memory, flash memory or other non-volatile solid-state memories. In some examples, the memory 61 may include memories that are remotely disposed with respect to the processor 60, and these remote memories may be connected to the base station via a network. The examples of the preceding network include, but are not limited to, the Internet, an intranet, a network, a mobile communication network, and a combination thereof.

The communications interface 62 may be configured to receive and send data.

An embodiment of the present disclosure further provides a computer-readable storage medium. The computer-readable storage medium is configured to store a computer program which, when executed by a processor, performs the method provided by any one of the embodiments of the present application.

The computer storage medium in this embodiment of the present application may use any combination of one or more computer-readable media. The computer-readable medium may be a computer-readable signal medium or a computer-readable storage medium. The computer-readable storage medium may be, but is not limited to, an electrical, magnetic, optical, electromagnetic, infrared, or semiconductor system, apparatus, or element, or any combination thereof. The computer-readable storage medium includes (a non-exhaustive list): an electrical connection having one or more wires, a portable computer disk, a hard disk, a random-access memory (RAM), a read-only memory (ROM), an electrically erasable, programmable read-only memory (EPROM), a flash memory, an optical fiber, a portable compact disk read-only memory (CD-ROM), an optical memory device, a magnetic memory device or any suitable combination thereof. In this application, the computer-readable storage medium may be any tangible medium including or storing a program, and the program may be used by or in conjunction with an instruction execution system, apparatus, or element.

The computer-readable signal medium may include a data signal propagated in a baseband or as part of a carrier, and the data signal carries computer-readable program codes. Such a propagated data signal may be in multiple forms, including but not limited to, an electromagnetic signal, an optical signal or any suitable combination thereof. The computer-readable signal medium may further be any computer-readable medium that is not a computer-readable storage medium and that can send, propagate or transmit a program for use by or in connection with an instruction execution system, apparatus or device.

The program codes included on the computer-readable medium may be transmitted on any suitable medium, including but not limited to wireless, wireline, optical fiber cable, radio frequency (RE), etc., or any suitable combination of the foregoing.

Computer program codes for performing the operations of the present disclosure may be written in one or more programming languages or a combination of multiple programming languages. The programming languages include object-oriented programming languages such as Java, Smalltalk, C++, Ruby, and Go, and further include conventional procedural programming languages such as C language or similar programming languages. The program code may be executed entirely on a user's computer, partly on the user's computer, as a stand-alone software package, partly on the user's computer and partly on a remote computer or entirely on the remote computer or server. In the scenario involving the remote computer, the remote computer may be connected to the user's computer through any type of network, including a local area network (LAN) or a wide area network (WAN), or may be connected to an external computer (for example, through the Internet using an Internet service provider).

It is to be understood by those skilled in the art that the term "user terminal" covers any suitable type of wireless user devices, for example, a mobile phone, a portable data processing apparatus, a portable web browser, or a vehicle-mounted mobile station.

In general, various embodiments of the present application may be implemented in hardware or special purpose circuits, software, logic or any combination thereof. For example, the above-mentioned embodiments, in some aspects, may be implemented in hardware while in other aspects, the embodiments may be implemented in firmware or software that may be executed by a controller, a microprocessor, or other computing devices, which is not limited thereto.

The embodiments of the present application may be implemented by computer program instructions executed by a data processor of a mobile device, such as in the processor entity, or by hardware, or by a combination of software and hardware. The computer program instructions may be assembly instructions, instruction set architecture (ISA) instructions, machine instructions, machine-related instructions, microcodes, firmware instructions, status setting data or source or object codes written in any combination of one or more programming languages.

A block diagram of any logic flow in drawings of the present application may represent program steps, or interconnected logic circuits, modules, and functions, or a combination of program steps and logic circuits, modules and functions. The computer programs may be stored in a memory. The memory may be of any type appropriate for the local technical environment and may be implemented by using any appropriate data storage technology, such as, but not limited to, a read-only memory (ROM), a random-access memory (RAM), an optical storage apparatus and system (a digital video disc (DVD) or a compact disk (CD)), and the like. The computer-readable storage medium may include a non-transitory storage medium. The data processor may be of any type suitable to the local technical environment, and for example, includes, but is not limited to, a general-purpose computer, a special-purpose computer, a microprocessor, a digital signal processing (DSP), an application-specific integrated circuit (ASIC), a field-programmable gate array (FGPA), and a processor based on a multi-core processor architecture.

What is claimed is:

1. A control information indicating method, comprising:
    sending, by a first communication node, control information to a second communication node, wherein the control information comprises a 10-bit indication that schedules at least one transport block, wherein each of the at least one transport block corresponds to a respective hybrid automatic repeat request (HARQ) process, and wherein the 10-bit indication indicates a modulation and coding scheme (MCS), a HARQ process index corresponding to the respective HARQ process, and new data indication (NDI) information, wherein the MCS occupies at least four bits in the 10-bit indication, wherein a number of bits representing the NDI information in the 10-bit indication varies based on a number of the at least one transport block scheduled by the control information; and
    performing a transmission using the at least one transport block based on the control information.

2. The method of claim 1, wherein the control information is included in a Downlink Control Information (DCI) having a format of 6-0A or 6-0B to trigger an early termination of the transmission.

3. The method of claim 1, wherein four bits of the 10-bit indication indicate the HARQ information in a manner of a bitmap.

4. The method of claim 1, wherein a remaining state of a joint indication domain 10 bits of the HARQ process index, the number of the at least one transport block, the NDI information and the MCS information is used for triggering an early termination.

5. The method of claim 1, wherein in a case where an early termination is triggered, the method comprises:
    indicating at least one HARQ process that needs to be terminated by using a manner of an n-bit bitmap, wherein n is a maximum number of scheduled HARQ processes.

6. The method of claim 1, wherein a number of corresponding states of the 10-bit indication is 880.

7. A control information indicating method, comprising:
    receiving, by a second communication node, control information from a first communication node, wherein the control information comprises a 10-bit indication that schedules at least one transport block, wherein each of the at least one transport block corresponds to a respective hybrid automatic repeat request (HARQ) process, and wherein the 10-bit indication indicates a modulation and coding scheme (MCS), a HARQ process index corresponding to the respective HARQ process, and new data indication (NDI) information, wherein the MCS occupies at least four bits in the 10-bit indication, wherein a number of bits representing the NDI information in the 10-bit indication varies based on a number of the at least one transport block scheduled by the control information and
    performing a transmission using the at least one transport block based on the control information.

8. The method of claim 7, wherein the control information is included in a Downlink Control Information (DCI) having a format of 6-0A or 6-0B to trigger an early termination of the transmission, the method further comprising:
    triggering an early termination of the transmission upon detecting the 10-bit indication of the control information.

9. The method of claim 7, wherein the four bits of the 10-bit indication indicate the HARQ information in a manner of a bitmap.

10. The method of claim 7, wherein a remaining state of a joint indication domain 10 bits of the HARQ process index, the number of the at least one transport block, the NDI information and the MCS information is used for triggering an early termination.

11. The method of claim 7, wherein in a case where an early termination is triggered, the method comprises:
    indicating at least one HARQ process that needs to be terminated by using a manner of an n-bit bitmap, wherein n is a maximum number of scheduled HARQ processes.

12. A communication node, comprising:
    a sending module configured to:
    transmit control information to a second communication node, wherein the control information comprises a 10-bit indication that schedules at least one transport block, wherein each of the at least one transport block corresponds to a respective hybrid automatic repeat request (HARQ) process, and wherein the 10-bit indication indicates a modulation and coding scheme (MCS), a HARQ process index corresponding to the respective HARQ process, and new data indication (NDI) information, wherein the MCS occupies at least four bits in the 10-bit indication, wherein a number of bits representing the NDI information in the 10-bit indication varies based on a number of the at least one transport block scheduled by the control information; and perform a transmission using the at least one transport block based on the control information.

13. The communication node of claim 12, wherein a number of corresponding states of the 10-bit indication is 880.

14. The communication node of claim 12, wherein the control information is included in a Downlink Control Information (DCI) having a format of 6-0A or 6-0B to trigger an early termination of the transmission.

15. The communication node of claim 12, wherein four bits of the 10-bit indication indicate the HARQ information in a manner of a bitmap.

16. The communication node of claim 12, wherein a remaining state of a joint indication domain 10 bits of the HARQ process index, the number of the at least one transport block, the NDI information and the MCS is used for triggering an early termination.

17. The communication node of claim 12, comprising a processor that is configured to, in a case where an early termination is triggered:
   indicate at least one HARQ process that needs to be terminated by using a manner of an n-bit bitmap, wherein n is a maximum number of scheduled HARQ processes.

18. The method of claim 7, wherein a number of corresponding states of the 10-bit indication is 880.

19. A communication node, comprising: a processor and a receiving module, the receiving module configured to:
   receive control information from a first communication node, wherein the control information comprises a 10-bit indication that schedules at least one transport block, wherein each of the at least one transport block corresponds to a respective hybrid automatic repeat request (HARQ) process, and wherein the 10-bit indication indicates a modulation and coding scheme (MCS), a HARQ process index corresponding to the respective HARQ process, and new data indication (NDI) information, wherein the MCS occupies at least four bits in the 10-bit indication, wherein a number of bits representing the NDI information in the 10-bit indication varies based on a number of the at least one transport block scheduled by the control information, and
   a sending module configured to perform a transmission using the at least one transport block based on the control information.

20. The communication node of claim 19, wherein the control information is included in a Downlink Control Information (DCI) having a format of 6-0A or 6-0B, the processor further configured to trigger an early termination of the transmission upon detecting the 10-bit indication of the control information.

21. The communication node of claim 19, wherein four bits of the 10-bit indication indicate the HARQ information in a manner of a bitmap.

22. The communication node of claim 19, wherein a remaining state of a joint indication domain 10 bits of the HARQ process index, the number of the at least one transport block, the NDI information and the MCS is used for triggering an early termination.

23. The communication node of claim 19, comprising a processor that is configured to, in a case where an early termination is triggered:
   indicate at least one HARQ process that needs to be terminated by using a manner of an n-bit bitmap, wherein n is a maximum number of scheduled HARQ processes.

24. The communication node of claim 19, wherein a number of corresponding states of the 10-bit indication is 880.

* * * * *